(12) United States Patent
Matecki et al.

(10) Patent No.: US 10,661,646 B2
(45) Date of Patent: May 26, 2020

(54) BATTERY TRAY FLOOR ASSEMBLY FOR ELECTRIC VEHICLES

(71) Applicant: Shape Corp., Grand Haven, MI (US)

(72) Inventors: Joseph Robert Matecki, Allendale, MI (US); Mark Charles Stephens, Grand Rapids, MI (US); Helen Weykamp, Grand Haven, MI (US)

(73) Assignee: Shape Corp., Grand Haven, MI (US)

(*) Notice: Subject to any disclaimer, the term of this patent is extended or adjusted under 35 U.S.C. 154(b) by 0 days.

(21) Appl. No.: 16/152,147

(22) Filed: Oct. 4, 2018

(65) Prior Publication Data

US 2019/0100090 A1    Apr. 4, 2019

Related U.S. Application Data

(60) Provisional application No. 62/568,051, filed on Oct. 4, 2017.

(51) Int. Cl.
*B60K 1/04* (2019.01)
*H01M 2/10* (2006.01)
*B60L 50/60* (2019.01)

(52) U.S. Cl.
CPC ............ *B60K 1/04* (2013.01); *B60L 50/66* (2019.02); *H01M 2/1072* (2013.01);
(Continued)

(58) Field of Classification Search
CPC ... B60K 1/04; B60K 2001/0438; B60L 50/66; B60L 50/60; B60L 50/64; B60L 50/50;
(Continued)

(56) References Cited

U.S. PATENT DOCUMENTS 3,708,028 A    1/1973   Hafer
3,930,552 A    1/1976   Kunkle et al.
(Continued)

FOREIGN PATENT DOCUMENTS

AT    511428 A1    11/2012
AT    511670 A1    1/2013
(Continued)

OTHER PUBLICATIONS

Korean Intellectual Propery Office (ISA), International Search Report and Written Opinion for International Application No. PCT/US2018/054423, dated Jan. 28, 2019.
(Continued)

*Primary Examiner* — John D Walters
(74) *Attorney, Agent, or Firm* — Honigman LLP

(57) ABSTRACT

A vehicle battery tray has a floor assembly with elongated tray sections that attach together at edge portions of adjacent tray sections of the elongated tray sections to form a floor structure that supports vehicle batteries contained in the vehicle battery tray. The elongated tray sections may have substantially consistent cross-sectional shapes that extends along a length of the tray sections. A thickness of the tray sections at a central area of the floor structure may be greater than a thickness of another one of the elongated tray sections at an outboard area of the floor structure, such as to withstand an equal or greater transverse bending moment than the outboard area of the floor structure.

20 Claims, 13 Drawing Sheets

(52) U.S. Cl.
CPC ....... *H01M 2/1077* (2013.01); *H01M 2/1083* (2013.01); *B60K 2001/0438* (2013.01); *B60Y 2306/01* (2013.01); *B60Y 2410/124* (2013.01); *B60Y 2410/125* (2013.01); *H01M 2220/20* (2013.01)

(58) Field of Classification Search
CPC ............. H01M 2/1077; H01M 2/1083; H01M 2220/20; H01M 2/1072; B60Y 2306/01; B60Y 2410/124; B60Y 2410/125
USPC ....................................................... 180/68.5
See application file for complete search history.

(56) References Cited

U.S. PATENT DOCUMENTS

| | | |
|---|---|---|
| 3,983,952 A | 10/1976 | McKee |
| 4,174,014 A | 11/1979 | Bjorksten |
| 4,252,206 A | 2/1981 | Burkholder et al. |
| 4,317,497 A | 3/1982 | Alt et al. |
| 4,506,748 A | 3/1985 | Thomas |
| 5,015,545 A | 5/1991 | Brooks |
| 5,198,638 A | 3/1993 | Massacesi |
| 5,378,555 A | 1/1995 | Waters et al. |
| 5,390,754 A | 2/1995 | Masuyama et al. |
| 5,392,873 A | 2/1995 | Masuyama et al. |
| 5,476,151 A | 12/1995 | Tsuchida et al. |
| 5,501,289 A | 3/1996 | Nishikawa et al. |
| 5,513,721 A | 5/1996 | Ogawa et al. |
| 5,523,666 A | 6/1996 | Hoelzl et al. |
| 5,534,364 A | 7/1996 | Watanabe et al. |
| 5,549,443 A | 8/1996 | Harnmerslag |
| 5,555,950 A | 9/1996 | Harada et al. |
| 5,558,949 A | 9/1996 | Iwatsuki et al. |
| 5,561,359 A | 10/1996 | Matsuura et al. |
| 5,567,542 A | 10/1996 | Bae |
| 5,585,204 A | 12/1996 | Oshida et al. |
| 5,585,205 A | 12/1996 | Kohchi |
| 5,612,606 A | 3/1997 | Guimarin et al. |
| 5,620,057 A | 4/1997 | Klemen et al. |
| 5,709,280 A | 1/1998 | Beckley et al. |
| 5,736,272 A | 4/1998 | Veenstra et al. |
| 5,760,569 A | 6/1998 | Chase, Jr. |
| 5,833,023 A | 11/1998 | Shimizu |
| 5,853,058 A | 12/1998 | Endo et al. |
| 5,866,276 A | 2/1999 | Ogami et al. |
| 5,934,053 A | 8/1999 | Fillman et al. |
| 6,040,080 A | 3/2000 | Minami et al. |
| 6,085,854 A | 7/2000 | Nishikawa |
| 6,094,927 A | 8/2000 | Anazawa et al. |
| 6,109,380 A | 8/2000 | Veenstra |
| 6,130,003 A | 10/2000 | Etoh et al. |
| 6,158,538 A | 12/2000 | Botzelmann et al. |
| 6,188,574 B1 | 2/2001 | Anazawa |
| 6,189,635 B1 | 2/2001 | Schuler et al. |
| 6,220,380 B1 | 4/2001 | Mita et al. |
| 6,227,322 B1 | 5/2001 | Nishikawa |
| 6,260,645 B1 | 7/2001 | Pawlowski et al. |
| 6,402,229 B1 | 6/2002 | Suganuma |
| 6,406,812 B1 | 6/2002 | Dreulle et al. |
| 6,462,949 B1 | 10/2002 | Parish, IV et al. |
| 6,541,151 B2 | 4/2003 | Minamiura et al. |
| 6,541,154 B2 | 4/2003 | Oogami et al. |
| 6,565,836 B2 | 5/2003 | Ovshinsky et al. |
| 6,598,691 B2 | 7/2003 | Mita et al. |
| 6,648,090 B2 | 11/2003 | Iwase |
| 6,668,957 B2 | 12/2003 | King |
| 6,736,229 B1 | 5/2004 | Amori et al. |
| 6,811,197 B1 | 11/2004 | Grabowski et al. |
| 7,004,274 B2 | 2/2006 | Shibasawa et al. |
| 7,017,361 B2 | 3/2006 | Kwon |
| 7,070,015 B2 | 7/2006 | Mathews et al. |
| 7,128,999 B1 | 10/2006 | Martin et al. |
| 7,201,384 B2 | 4/2007 | Chaney |
| 7,207,405 B2 | 4/2007 | Reid et al. |
| 7,221,123 B2 | 5/2007 | Chen |
| 7,249,644 B2 | 7/2007 | Honda et al. |
| 7,267,190 B2 | 9/2007 | Hirano |
| 7,323,272 B2 | 1/2008 | Ambrosio et al. |
| 7,401,669 B2 | 7/2008 | Fujii et al. |
| 7,405,022 B2 | 7/2008 | Kang et al. |
| 7,412,309 B2 | 8/2008 | Honda |
| 7,416,039 B1 | 8/2008 | Anderson et al. |
| 7,424,926 B2 | 9/2008 | Tsuchiya |
| 7,427,156 B2 | 9/2008 | Ambrosio et al. |
| 7,501,793 B2 | 3/2009 | Kadouchi et al. |
| 7,507,499 B2 | 3/2009 | Zhou et al. |
| 7,520,355 B2 | 4/2009 | Chaney |
| 7,610,978 B2 | 11/2009 | Takasaki et al. |
| 7,654,351 B2 | 2/2010 | Koike et al. |
| 7,654,352 B2 | 2/2010 | Takasaki et al. |
| 7,661,370 B2 | 2/2010 | Pike et al. |
| 7,686,111 B2 | 3/2010 | Koenekamp et al. |
| 7,687,192 B2 | 3/2010 | Yoon et al. |
| 7,713,655 B2 | 5/2010 | Ha et al. |
| 7,749,644 B2 | 7/2010 | Nishino |
| 7,807,288 B2 | 10/2010 | Yoon et al. |
| 7,854,282 B2 | 12/2010 | Lee et al. |
| 7,858,229 B2 | 12/2010 | Shin et al. |
| 7,875,378 B2 | 1/2011 | Yang et al. |
| 7,879,480 B2 | 2/2011 | Yoon et al. |
| 7,879,485 B2 | 2/2011 | Yoon et al. |
| 7,926,602 B2 | 4/2011 | Takasaki |
| 7,931,105 B2 | 4/2011 | Sato et al. |
| 7,948,207 B2 | 5/2011 | Scheucher |
| 7,967,093 B2 | 6/2011 | Nagasaka |
| 7,984,779 B2 | 7/2011 | Boegelein et al. |
| 7,990,105 B2 | 8/2011 | Matsumoto et al. |
| 7,993,155 B2 | 8/2011 | Heichal et al. |
| 7,997,368 B2 | 8/2011 | Takasaki et al. |
| 8,006,626 B2 | 8/2011 | Kumar et al. |
| 8,006,793 B2 | 8/2011 | Heichal et al. |
| 8,012,620 B2 | 9/2011 | Takasaki et al. |
| 8,034,476 B2 | 10/2011 | Ha et al. |
| 8,037,954 B2 | 10/2011 | Taguchi |
| 8,079,435 B2 | 12/2011 | Takasaki et al. |
| 8,091,669 B2 | 1/2012 | Taneda et al. |
| 8,110,300 B2 | 2/2012 | Niedzwiecki et al. |
| 8,146,694 B2 | 4/2012 | Hamidi |
| 8,163,420 B2 | 4/2012 | Okada et al. |
| 8,167,070 B2 | 5/2012 | Takamura et al. |
| 8,186,468 B2 | 5/2012 | Parrett et al. |
| 8,187,736 B2 | 5/2012 | Park et al. |
| 8,205,702 B2 | 6/2012 | Hoermandinger et al. |
| 8,206,846 B2 | 6/2012 | Yang et al. |
| 8,210,301 B2 | 7/2012 | Hashimoto et al. |
| 8,211,564 B2 | 7/2012 | Choi et al. |
| 8,256,552 B2 | 9/2012 | Okada |
| 8,268,469 B2 | 9/2012 | Hermann et al. |
| 8,268,472 B2 | 9/2012 | Ronning et al. |
| 8,276,697 B2 | 10/2012 | Takasaki |
| 8,286,743 B2 | 10/2012 | Rawlinson |
| 8,298,698 B2 | 10/2012 | Chung et al. |
| 8,304,104 B2 | 11/2012 | Lee et al. |
| 8,307,930 B2 | 11/2012 | Sailor et al. |
| 8,323,819 B2 | 12/2012 | Lee et al. |
| 8,327,962 B2 | 12/2012 | Bergmeier et al. |
| 8,343,647 B2 | 1/2013 | Ahn et al. |
| 8,353,374 B2 | 1/2013 | Sugawara et al. |
| 8,371,401 B1 | 2/2013 | Illustrato |
| 8,397,853 B2 | 3/2013 | Stefani et al. |
| 8,409,743 B2 | 4/2013 | Okada et al. |
| 8,418,795 B2 | 4/2013 | Sasage et al. |
| 8,420,245 B2 | 4/2013 | Im et al. |
| 8,439,144 B2 | 5/2013 | Murase |
| 8,453,773 B2 | 6/2013 | Hill et al. |
| 8,453,778 B2 | 6/2013 | Bannier et al. |
| 8,455,122 B2 | 6/2013 | Shin et al. |
| 8,465,866 B2 | 6/2013 | Kim |
| 8,481,343 B2 | 7/2013 | Hsin et al. |
| 8,486,557 B2 | 7/2013 | Lee et al. |
| 8,492,016 B2 | 7/2013 | Shin et al. |
| 8,501,344 B2 | 8/2013 | Yang et al. |
| 8,511,412 B2 | 8/2013 | Kawaguchi et al. |

(56) References Cited

U.S. PATENT DOCUMENTS

| | | |
|---|---|---|
| 8,540,282 B2 | 9/2013 | Yoda et al. |
| 8,551,640 B2 | 10/2013 | Hedrich et al. |
| 8,557,425 B2 | 10/2013 | Ronning et al. |
| 8,561,743 B2 | 10/2013 | Iwasa et al. |
| 8,563,155 B2 | 10/2013 | Lee et al. |
| 8,567,543 B2 | 10/2013 | Kubota et al. |
| 8,584,780 B2 | 11/2013 | Yu et al. |
| 8,587,907 B2 | 11/2013 | Gaben |
| 8,592,069 B1 | 11/2013 | Anderson et al. |
| 8,602,139 B2 | 12/2013 | Takamura et al. |
| 8,609,271 B2 | 12/2013 | Yoon et al. |
| 8,658,303 B2 | 2/2014 | Chung et al. |
| 8,672,077 B2 | 3/2014 | Sand et al. |
| 8,672,354 B2 | 3/2014 | Kim et al. |
| 8,689,918 B2 | 4/2014 | Yu et al. |
| 8,689,919 B2 | 4/2014 | Maeda et al. |
| 8,691,421 B2 | 4/2014 | Lee et al. |
| 8,708,080 B2 | 4/2014 | Lee et al. |
| 8,708,402 B2 | 4/2014 | Saeki |
| 8,709,628 B2 | 4/2014 | Carignan et al. |
| 8,722,224 B2 | 5/2014 | Lee et al. |
| 8,728,648 B2 | 5/2014 | Choo et al. |
| 8,733,486 B2 | 5/2014 | Nishiura et al. |
| 8,733,488 B2 | 5/2014 | Umetani |
| 8,739,908 B2 | 6/2014 | Taniguchi et al. |
| 8,739,909 B2 * | 6/2014 | Hashimoto ......... H01M 2/1083 180/68.5 |
| 8,741,466 B2 | 6/2014 | Youngs et al. |
| 8,746,391 B2 | 6/2014 | Atsuchi et al. |
| 8,757,304 B2 | 6/2014 | Amano et al. |
| 8,789,634 B2 | 7/2014 | Nitawaki |
| 8,794,365 B2 | 8/2014 | Matsuzawa et al. |
| 8,802,259 B2 | 8/2014 | Lee et al. |
| 8,803,477 B2 | 8/2014 | Kittell |
| 8,808,893 B2 | 8/2014 | Choo et al. |
| 8,818,588 B2 | 8/2014 | Ambrosio et al. |
| 8,820,444 B2 | 9/2014 | Nguyen |
| 8,820,461 B2 | 9/2014 | Shinde et al. |
| 8,827,023 B2 | 9/2014 | Matsuda et al. |
| 8,833,495 B2 | 9/2014 | Iwata et al. |
| 8,833,499 B2 | 9/2014 | Rawlinson |
| 8,835,033 B2 | 9/2014 | Choi et al. |
| 8,841,013 B2 | 9/2014 | Choo et al. |
| 8,846,233 B2 | 9/2014 | Lee et al. |
| 8,846,234 B2 | 9/2014 | Lee et al. |
| 8,852,794 B2 | 10/2014 | Laitinen |
| 8,862,296 B2 | 10/2014 | Kurakawa et al. |
| 8,865,332 B2 | 10/2014 | Yang et al. |
| 8,875,828 B2 | 11/2014 | Rawlinson et al. |
| 8,895,173 B2 | 11/2014 | Gandhi et al. |
| 8,900,736 B2 | 12/2014 | Choi et al. |
| 8,905,170 B2 | 12/2014 | Kyoden et al. |
| 8,905,171 B2 | 12/2014 | Lee et al. |
| 8,911,899 B2 | 12/2014 | Lim et al. |
| 8,936,125 B2 | 1/2015 | Nakamori |
| 8,939,245 B2 | 1/2015 | Jaffrezic |
| 8,939,246 B2 | 1/2015 | Yamaguchi et al. |
| 8,951,655 B2 | 2/2015 | Chung et al. |
| 8,960,346 B2 | 2/2015 | Ogawa |
| 8,970,061 B2 | 3/2015 | Nakagawa et al. |
| 8,973,697 B2 | 3/2015 | Matsuda |
| 8,975,774 B2 | 3/2015 | Kreutzer et al. |
| 8,978,800 B2 | 3/2015 | Soma' et al. |
| 8,980,458 B2 | 3/2015 | Honjo et al. |
| 8,986,864 B2 | 3/2015 | Wiegmann et al. |
| 9,004,535 B2 | 4/2015 | Wu |
| 9,012,051 B2 | 4/2015 | Lee et al. |
| 9,017,846 B2 | 4/2015 | Kawatani et al. |
| 9,023,502 B2 | 5/2015 | Favaretto |
| 9,023,503 B2 | 5/2015 | Seong et al. |
| 9,024,572 B2 | 5/2015 | Nishihara et al. |
| 9,033,084 B2 | 5/2015 | Joye |
| 9,033,085 B1 | 5/2015 | Rawlinson |
| 9,034,502 B2 | 5/2015 | Kano et al. |
| 9,052,168 B1 | 6/2015 | Rawlinson |
| 9,054,402 B1 | 6/2015 | Rawlinson |
| 9,061,714 B1 | 6/2015 | Albery et al. |
| 9,065,103 B2 | 6/2015 | Straubel et al. |
| 9,070,926 B2 | 6/2015 | Seong et al. |
| 9,073,426 B2 | 7/2015 | Tachikawa et al. |
| 9,077,058 B2 | 7/2015 | Yang et al. |
| 9,090,218 B2 | 7/2015 | Karashima |
| 9,093,701 B2 | 7/2015 | Kawatani et al. |
| 9,101,060 B2 | 8/2015 | Yamanaka et al. |
| 9,102,362 B2 | 8/2015 | Baccouche et al. |
| 9,126,637 B2 | 9/2015 | Eberle et al. |
| 9,136,514 B2 | 9/2015 | Kawatani et al. |
| 9,156,340 B2 | 10/2015 | van den Akker |
| 9,159,968 B2 | 10/2015 | Park et al. |
| 9,159,970 B2 | 10/2015 | Watanabe et al. |
| 9,160,042 B2 | 10/2015 | Fujii et al. |
| 9,160,214 B2 | 10/2015 | Matsuda |
| 9,172,071 B2 | 10/2015 | Yoshioka et al. |
| 9,174,520 B2 | 11/2015 | Katayama et al. |
| 9,184,477 B2 | 11/2015 | Jeong et al. |
| 9,192,450 B2 | 11/2015 | Yamashita et al. |
| 9,193,316 B2 | 11/2015 | McLaughlin et al. |
| 9,196,882 B2 | 11/2015 | Seong et al. |
| 9,203,064 B2 | 12/2015 | Lee et al. |
| 9,203,124 B2 | 12/2015 | Chung et al. |
| 9,205,749 B2 | 12/2015 | Sakamoto |
| 9,205,757 B2 | 12/2015 | Matsuda |
| 9,216,638 B2 | 12/2015 | Katayama et al. |
| 9,227,582 B2 | 1/2016 | Katayama et al. |
| 9,231,285 B2 | 1/2016 | Schmidt et al. |
| 9,236,587 B2 | 1/2016 | Lee et al. |
| 9,236,589 B2 | 1/2016 | Lee |
| 9,238,495 B2 | 1/2016 | Matsuda |
| 9,246,148 B2 | 1/2016 | Maguire |
| 9,252,409 B2 | 2/2016 | Lee et al. |
| 9,254,871 B2 | 2/2016 | Hotta et al. |
| 9,263,249 B2 | 2/2016 | Tomohiro et al. |
| 9,269,934 B2 | 2/2016 | Yang et al. |
| 9,277,674 B2 | 3/2016 | Watanabe |
| 9,281,505 B2 * | 3/2016 | Hihara ..................... B60K 1/04 |
| 9,281,546 B2 | 3/2016 | Chung et al. |
| 9,283,837 B1 | 3/2016 | Rawlinson |
| 9,306,201 B2 | 4/2016 | Lu et al. |
| 9,306,247 B2 | 4/2016 | Rawlinson |
| 9,308,829 B2 | 4/2016 | Matsuda |
| 9,308,966 B2 | 4/2016 | Kosuge et al. |
| 9,312,579 B2 | 4/2016 | Jeong et al. |
| 9,321,357 B2 | 4/2016 | Caldeira et al. |
| 9,321,433 B2 | 4/2016 | Yin et al. |
| 9,327,586 B2 | 5/2016 | Miyashiro |
| 9,331,321 B2 | 5/2016 | Berger et al. |
| 9,331,366 B2 | 5/2016 | Fuerstner et al. |
| 9,333,868 B2 | 5/2016 | Uchida et al. |
| 9,337,455 B2 | 5/2016 | Yang et al. |
| 9,337,457 B2 | 5/2016 | Yajima et al. |
| 9,337,458 B2 | 5/2016 | Kim |
| 9,337,516 B2 | 5/2016 | Klausner et al. |
| 9,346,346 B2 | 5/2016 | Murray |
| 9,350,003 B2 | 5/2016 | Wen et al. |
| 9,358,869 B2 | 6/2016 | Le Jaouen et al. |
| 9,373,828 B2 | 6/2016 | Kawatani et al. |
| 9,381,798 B2 | 7/2016 | Meyer-Ebeling |
| 9,412,984 B2 | 8/2016 | Fritz et al. |
| 9,413,043 B2 | 8/2016 | Kim et al. |
| 9,425,628 B2 | 8/2016 | Pham et al. |
| 9,434,243 B2 | 9/2016 | Nakao |
| 9,434,270 B1 | 9/2016 | Penilla et al. |
| 9,434,333 B2 | 9/2016 | Sloan et al. |
| 9,444,082 B2 | 9/2016 | Tsujimura et al. |
| 9,446,643 B1 | 9/2016 | Vollmer |
| 9,450,228 B2 | 9/2016 | Sakai et al. |
| 9,452,686 B2 | 9/2016 | Yang et al. |
| 9,457,666 B2 | 10/2016 | Caldeira et al. |
| 9,461,284 B2 | 10/2016 | Power et al. |
| 9,461,454 B2 | 10/2016 | Auguet et al. |
| 9,463,695 B2 | 10/2016 | Matsuda et al. |
| 9,478,778 B2 | 10/2016 | Im et al. |
| 9,481,249 B2 | 11/2016 | Yamazaki |
| 9,484,564 B2 | 11/2016 | Stuetz et al. |

(56) References Cited

U.S. PATENT DOCUMENTS

| | | |
|---|---|---|
| 9,484,592 B2 | 11/2016 | Roh et al. |
| 9,487,237 B1 | 11/2016 | Vollmer |
| 9,502,700 B2 | 11/2016 | Haussman |
| 9,520,624 B2 | 12/2016 | Lee et al. |
| 9,531,041 B2 | 12/2016 | Hwang |
| 9,533,546 B2 | 1/2017 | Cheng |
| 9,533,600 B1 | 1/2017 | Schwab et al. |
| 9,537,186 B2 | 1/2017 | Chung et al. |
| 9,537,187 B2 | 1/2017 | Chung et al. |
| 9,540,055 B2 | 1/2017 | Berger et al. |
| 9,545,962 B2 | 1/2017 | Pang |
| 9,545,968 B2 | 1/2017 | Miyashiro et al. |
| 9,561,735 B2 | 2/2017 | Nozaki |
| 9,564,663 B2 | 2/2017 | Kim et al. |
| 9,564,664 B2 | 2/2017 | Tanigaki et al. |
| 9,579,963 B2 | 2/2017 | Landgraf |
| 9,579,983 B2 | 2/2017 | Inoue |
| 9,579,986 B2 | 2/2017 | Bachir |
| 9,590,216 B2 | 3/2017 | Maguire et al. |
| 9,597,973 B2 | 3/2017 | Penilla et al. |
| 9,597,976 B2 | 3/2017 | Dickinson et al. |
| 9,608,244 B2 | 3/2017 | Shin et al. |
| 9,614,206 B2 | 4/2017 | Choi et al. |
| 9,614,260 B2 | 4/2017 | Kim et al. |
| 9,616,766 B2 | 4/2017 | Fujii |
| 9,620,826 B2 | 4/2017 | Yang et al. |
| 9,623,742 B2 | 4/2017 | Ikeda et al. |
| 9,623,911 B2 | 4/2017 | Kano et al. |
| 9,627,664 B2 | 4/2017 | Choo et al. |
| 9,627,666 B2 | 4/2017 | Baldwin |
| 9,630,483 B2 | 4/2017 | Yamada et al. |
| 9,636,984 B1 | 5/2017 | Baccouche et al. |
| 9,643,660 B2 | 5/2017 | Vollmer |
| 9,647,251 B2 | 5/2017 | Prinz et al. |
| 9,653,712 B2 | 5/2017 | Seong et al. |
| 9,660,236 B2 | 5/2017 | Kondo et al. |
| 9,660,288 B2 | 5/2017 | Gendlin et al. |
| 9,660,304 B2 | 5/2017 | Choi et al. |
| 9,673,433 B1 | 6/2017 | Pullalarevu et al. |
| 9,673,495 B2 | 6/2017 | Lee et al. |
| 9,692,095 B2 | 6/2017 | Harris |
| 9,694,772 B2 | 7/2017 | Ikeda et al. |
| 9,718,340 B2 * | 8/2017 | Berger ............... B60K 1/00 |
| 9,789,908 B2 | 10/2017 | Tsukada et al. |
| 9,796,424 B2 | 10/2017 | Sakaguchi et al. |
| 9,802,650 B2 | 10/2017 | Nishida et al. |
| 10,059,382 B2 | 8/2018 | Nusier et al. |
| 2001/0046624 A1 | 11/2001 | Goto et al. |
| 2001/0052433 A1 | 12/2001 | Harris et al. |
| 2002/0066608 A1 | 6/2002 | Guenard et al. |
| 2003/0089540 A1 | 5/2003 | Koike et al. |
| 2003/0188417 A1 | 10/2003 | McGlinchy et al. |
| 2003/0209375 A1 | 11/2003 | Suzuki et al. |
| 2003/0230443 A1 | 12/2003 | Cramer et al. |
| 2004/0142232 A1 | 7/2004 | Risca et al. |
| 2004/0261377 A1 | 12/2004 | Sung |
| 2005/0095500 A1 | 5/2005 | Corless et al. |
| 2006/0001399 A1 | 1/2006 | Salasoo et al. |
| 2006/0024566 A1 | 2/2006 | Plummer |
| 2008/0179040 A1 | 7/2008 | Rosenbaum |
| 2008/0199771 A1 | 8/2008 | Chiu |
| 2008/0238152 A1 | 10/2008 | Konishi et al. |
| 2008/0280192 A1 | 11/2008 | Drozdz et al. |
| 2008/0311468 A1 | 12/2008 | Hermann et al. |
| 2009/0014221 A1 | 1/2009 | Kim et al. |
| 2009/0058355 A1 | 3/2009 | Meyer |
| 2010/0025131 A1 | 2/2010 | Gloceri et al. |
| 2010/0112419 A1 | 5/2010 | Jang et al. |
| 2010/0159317 A1 | 6/2010 | Taghikhani et al. |
| 2010/0173191 A1 | 7/2010 | Meintschel et al. |
| 2010/0307848 A1 | 12/2010 | Hashimoto et al. |
| 2011/0036657 A1 | 2/2011 | Bland et al. |
| 2011/0070474 A1 | 3/2011 | Lee et al. |
| 2011/0104530 A1 | 5/2011 | Muller et al. |
| 2011/0123309 A1 | 5/2011 | Berdelle-Hilge et al. |
| 2011/0132580 A1 | 6/2011 | Herrmann et al. |
| 2011/0143179 A1 | 6/2011 | Nakamori |
| 2011/0168461 A1 | 7/2011 | Meyer-Ebeling |
| 2011/0240385 A1 | 10/2011 | Farmer |
| 2012/0091955 A1 | 4/2012 | Gao |
| 2012/0103714 A1 | 5/2012 | Choi et al. |
| 2012/0118653 A1 | 5/2012 | Ogihara et al. |
| 2012/0125702 A1 | 5/2012 | Bergfjord |
| 2012/0129031 A1 | 5/2012 | Kim |
| 2012/0160583 A1 | 6/2012 | Rawlinson |
| 2012/0223113 A1 * | 9/2012 | Gaisne ............... H01M 2/1083 224/538 |
| 2012/0298433 A1 | 11/2012 | Ohkura |
| 2012/0301765 A1 | 11/2012 | Loo et al. |
| 2012/0312610 A1 | 12/2012 | Kim et al. |
| 2013/0020139 A1 | 1/2013 | Kim et al. |
| 2013/0122337 A1 | 5/2013 | Katayama et al. |
| 2013/0122338 A1 | 5/2013 | Katayama et al. |
| 2013/0143081 A1 | 6/2013 | Watanabe et al. |
| 2013/0164580 A1 | 6/2013 | Au |
| 2013/0192908 A1 | 8/2013 | Schlagheck |
| 2013/0230759 A1 | 9/2013 | Jeong et al. |
| 2013/0270863 A1 | 10/2013 | Young et al. |
| 2013/0273829 A1 | 10/2013 | Obasih et al. |
| 2013/0284531 A1 | 10/2013 | Oonuma et al. |
| 2013/0337297 A1 | 12/2013 | Lee et al. |
| 2014/0017546 A1 | 1/2014 | Yanagi |
| 2014/0045026 A1 | 2/2014 | Fritz et al. |
| 2014/0072845 A1 | 3/2014 | Oh et al. |
| 2014/0072856 A1 | 3/2014 | Chung et al. |
| 2014/0087228 A1 | 3/2014 | Fabian et al. |
| 2014/0120406 A1 | 5/2014 | Kim |
| 2014/0141298 A1 | 5/2014 | Michelitsch |
| 2014/0178721 A1 | 6/2014 | Chung et al. |
| 2014/0193683 A1 | 7/2014 | Mardall et al. |
| 2014/0202671 A1 | 7/2014 | Yan |
| 2014/0212723 A1 | 7/2014 | Lee et al. |
| 2014/0242429 A1 | 8/2014 | Lee et al. |
| 2014/0246259 A1 | 9/2014 | Yamamura et al. |
| 2014/0262573 A1 | 9/2014 | Ito et al. |
| 2014/0272501 A1 | 9/2014 | O'Brien et al. |
| 2014/0284125 A1 | 9/2014 | Katayama et al. |
| 2014/0302360 A1 | 10/2014 | Klammler et al. |
| 2014/0322583 A1 | 10/2014 | Choi et al. |
| 2014/0338999 A1 | 11/2014 | Fujii et al. |
| 2015/0004458 A1 | 1/2015 | Lee |
| 2015/0010795 A1 | 1/2015 | Tanigaki et al. |
| 2015/0053493 A1 | 2/2015 | Kees et al. |
| 2015/0056481 A1 | 2/2015 | Cohen et al. |
| 2015/0060164 A1 | 3/2015 | Wang et al. |
| 2015/0061381 A1 | 3/2015 | Biskup |
| 2015/0061413 A1 | 3/2015 | Janarthanam et al. |
| 2015/0064535 A1 | 3/2015 | Seong et al. |
| 2015/0104686 A1 | 4/2015 | Brommer et al. |
| 2015/0136506 A1 | 5/2015 | Quinn et al. |
| 2015/0188207 A1 | 7/2015 | Son et al. |
| 2015/0207115 A1 | 7/2015 | Wondraczek |
| 2015/0236326 A1 | 8/2015 | Kim et al. |
| 2015/0243956 A1 | 8/2015 | Loo et al. |
| 2015/0255764 A1 | 9/2015 | Loo et al. |
| 2015/0280188 A1 | 10/2015 | Nozaki et al. |
| 2015/0291046 A1 | 10/2015 | Kawabata |
| 2015/0298661 A1 | 10/2015 | Zhang |
| 2015/0314830 A1 | 11/2015 | Inoue |
| 2015/0329174 A1 | 11/2015 | Inoue |
| 2015/0329175 A1 | 11/2015 | Inoue |
| 2015/0329176 A1 | 11/2015 | Inoue |
| 2015/0344081 A1 | 12/2015 | Kor et al. |
| 2016/0023689 A1 | 1/2016 | Berger et al. |
| 2016/0028056 A1 | 1/2016 | Lee et al. |
| 2016/0068195 A1 | 3/2016 | Hentrich et al. |
| 2016/0072108 A1 | 3/2016 | Keller et al. |
| 2016/0087319 A1 | 3/2016 | Roh et al. |
| 2016/0093856 A1 | 3/2016 | DeKeuster et al. |
| 2016/0133899 A1 | 5/2016 | Qiao et al. |
| 2016/0137046 A1 | 5/2016 | Song |
| 2016/0141738 A1 | 5/2016 | Kwag |
| 2016/0149177 A1 | 5/2016 | Sugeno et al. |
| 2016/0156005 A1 | 6/2016 | Elliot et al. |

(56) References Cited

U.S. PATENT DOCUMENTS

| | | | |
|---|---|---|---|
| 2016/0159221 A1 | 6/2016 | Chen et al. |
| 2016/0164053 A1 | 6/2016 | Lee et al. |
| 2016/0167544 A1 | 6/2016 | Barbat et al. |
| 2016/0176312 A1 | 6/2016 | Duhaime et al. |
| 2016/0197332 A1 | 7/2016 | Lee et al. |
| 2016/0197386 A1 | 7/2016 | Moon et al. |
| 2016/0197387 A1 | 7/2016 | Lee et al. |
| 2016/0204398 A1 | 7/2016 | Moon et al. |
| 2016/0207418 A1 | 7/2016 | Bergstrom et al. |
| 2016/0218335 A1 | 7/2016 | Baek |
| 2016/0222631 A1 | 8/2016 | Kohno et al. |
| 2016/0226040 A1 | 8/2016 | Mongeau et al. |
| 2016/0226108 A1 | 8/2016 | Kim et al. |
| 2016/0229309 A1 | 8/2016 | Mitsutani |
| 2016/0233468 A1 | 8/2016 | Nusier et al. |
| 2016/0236713 A1 | 8/2016 | Sakaguchi et al. |
| 2016/0248060 A1 | 8/2016 | Brambrink et al. |
| 2016/0248061 A1 | 8/2016 | Brambrink et al. |
| 2016/0257219 A1 | 9/2016 | Miller et al. |
| 2016/0280306 A1 | 9/2016 | Miyashiro et al. |
| 2016/0308180 A1 | 10/2016 | Kohda |
| 2016/0318579 A1 | 11/2016 | Miyashiro |
| 2016/0339855 A1 | 11/2016 | Chinavare et al. |
| 2016/0347161 A1 | 12/2016 | Kusumi et al. |
| 2016/0361984 A1 | 12/2016 | Manganaro |
| 2016/0368358 A1 | 12/2016 | Nagaosa |
| 2016/0375750 A1 | 12/2016 | Hokazono et al. |
| 2017/0001507 A1 | 1/2017 | Ashraf et al. |
| 2017/0005303 A1 | 1/2017 | Harris et al. |
| 2017/0005371 A1 | 1/2017 | Chidester et al. |
| 2017/0005375 A1 | 1/2017 | Walker |
| 2017/0029034 A1 | 2/2017 | Faruque et al. |
| 2017/0047563 A1 | 2/2017 | Lee et al. |
| 2017/0050533 A1 | 2/2017 | Wei et al. |
| 2017/0054120 A1 | 2/2017 | Templeman et al. |
| 2017/0062782 A1 | 3/2017 | Cho et al. |
| 2017/0084890 A1 | 3/2017 | Subramanian et al. |
| 2017/0088013 A1 | 3/2017 | Shimizu et al. |
| 2017/0088178 A1 | 3/2017 | Tsukada et al. |
| 2017/0106907 A1 | 4/2017 | Gong et al. |
| 2017/0106908 A1 | 4/2017 | Song |
| 2017/0144566 A1 | 5/2017 | Aschwer et al. |
| 2017/0190243 A1 | 7/2017 | Duan et al. |
| 2017/0194681 A1 | 7/2017 | Kim et al. |
| 2017/0200925 A1 | 7/2017 | Seo et al. |
| 2017/0214018 A1 | 7/2017 | Sun et al. |
| 2017/0222199 A1 | 8/2017 | Idikurt et al. |
| 2017/0232859 A1 | 8/2017 | Li |
| 2017/0288185 A1 | 10/2017 | Maguire |
| 2017/0331086 A1 | 11/2017 | Frehn et al. |
| 2018/0050607 A1 | 2/2018 | Matecki et al. |
| 2018/0062224 A1 | 3/2018 | Drabon et al. |
| 2018/0154754 A1 | 6/2018 | Rowley et al. |
| 2018/0186227 A1 | 7/2018 | Stephens et al. |
| 2018/0229593 A1 | 8/2018 | Hitz et al. |
| 2018/0233789 A1 | 8/2018 | Iqbal et al. |
| 2018/0236863 A1 | 8/2018 | Kawabe et al. |
| 2018/0237075 A1 | 8/2018 | Kawabe et al. |
| 2018/0323409 A1 | 11/2018 | Maier |
| 2018/0334022 A1 | 11/2018 | Rawlinson et al. |
| 2018/0337374 A1 | 11/2018 | Matecki et al. |
| 2018/0337377 A1 | 11/2018 | Stephens et al. |
| 2018/0337378 A1 | 11/2018 | Stephens et al. |
| 2019/0081298 A1 | 3/2019 | Matecki et al. |
| 2019/0100090 A1 | 4/2019 | Matecki et al. |

FOREIGN PATENT DOCUMENTS

| | | |
|---|---|---|
| AU | 2008200543 A1 | 8/2009 |
| CN | 100429805 C | 10/2008 |
| CN | 100429806 C | 10/2008 |
| CN | 102452293 A | 5/2012 |
| CN | 102802983 A | 11/2012 |
| CN | 103568820 A | 2/2014 |
| CN | 104010884 A | 8/2014 |
| CN | 106029407 A | 10/2016 |
| CN | 205645923 U | 10/2016 |
| CN | 106207029 A | 12/2016 |
| CN | 106410077 A | 2/2017 |
| DE | 4105246 A1 | 8/1992 |
| DE | 4129351 A1 | 5/1993 |
| DE | 4427322 A1 | 2/1996 |
| DE | 19534427 A1 | 3/1996 |
| DE | 4446257 A1 | 6/1996 |
| DE | 202005018897 U1 | 2/2006 |
| DE | 102004062932 A1 | 8/2006 |
| DE | 102007012893 A1 | 3/2008 |
| DE | 102007017019 A1 | 3/2008 |
| DE | 102007030542 A1 | 3/2008 |
| DE | 102006049269 A1 | 6/2008 |
| DE | 202008006698 U1 | 7/2008 |
| DE | 102007011026 A1 | 9/2008 |
| DE | 102007021293 A1 | 11/2008 |
| DE | 102007044526 A1 | 3/2009 |
| DE | 102007050103 A1 | 4/2009 |
| DE | 102007063187 B3 | 4/2009 |
| DE | 102008051786 A1 | 4/2009 |
| DE | 102007063194 A1 | 6/2009 |
| DE | 102008034880 A1 | 6/2009 |
| DE | 102007061562 A1 | 7/2009 |
| DE | 102008010813 A1 | 8/2009 |
| DE | 102008024007 A1 | 12/2009 |
| DE | 102008034695 A1 | 1/2010 |
| DE | 102008034700 A1 | 1/2010 |
| DE | 102008034856 A1 | 1/2010 |
| DE | 102008034860 A1 | 1/2010 |
| DE | 102008034863 A1 | 1/2010 |
| DE | 102008034873 A1 | 1/2010 |
| DE | 102008034889 A1 | 1/2010 |
| DE | 102008052284 A1 | 4/2010 |
| DE | 102008059953 A1 | 6/2010 |
| DE | 102008059964 A1 | 6/2010 |
| DE | 102008059966 A1 | 6/2010 |
| DE | 102008059967 A1 | 6/2010 |
| DE | 102008059969 A1 | 6/2010 |
| DE | 102008059971 A1 | 6/2010 |
| DE | 102008054968 A1 | 7/2010 |
| DE | 102010006514 A1 | 9/2010 |
| DE | 102009019384 A1 | 11/2010 |
| DE | 102009035488 A1 | 2/2011 |
| DE | 102009040598 A1 | 3/2011 |
| DE | 102010014484 A1 | 3/2011 |
| DE | 102009043635 A1 | 4/2011 |
| DE | 102010006514 A1 | 8/2011 |
| DE | 102010009063 A1 | 8/2011 |
| DE | 102010012992 A1 | 9/2011 |
| DE | 102010012996 A1 | 9/2011 |
| DE | 102010013025 A1 | 9/2011 |
| DE | 102010028728 A1 | 11/2011 |
| DE | 102011011698 A1 | 8/2012 |
| DE | 102011013182 A1 | 9/2012 |
| DE | 102011016526 A1 | 10/2012 |
| DE | 102011017459 A1 | 10/2012 |
| DE | 102011075820 A1 | 11/2012 |
| DE | 102011103990 A1 | 12/2012 |
| DE | 102011080053 A1 | 1/2013 |
| DE | 102011107007 A1 | 1/2013 |
| DE | 102011109309 A1 | 2/2013 |
| DE | 102011111537 A1 | 2/2013 |
| DE | 102011112598 A1 | 3/2013 |
| DE | 102011086049 A1 | 5/2013 |
| DE | 102011109011 A1 | 5/2013 |
| DE | 102011120010 A1 | 6/2013 |
| DE | 102012000622 A1 | 7/2013 |
| DE | 102012001596 A1 | 8/2013 |
| DE | 102012102657 A1 | 10/2013 |
| DE | 102012103149 A1 | 10/2013 |
| DE | 102013205215 A1 | 10/2013 |
| DE | 102013205323 A1 | 10/2013 |
| DE | 202013104224 U1 | 10/2013 |
| DE | 102012012897 A1 | 1/2014 |
| DE | 102012107548 A1 | 2/2014 |
| DE | 102012219301 A1 | 2/2014 |
| DE | 202012104339 U1 | 2/2014 |

(56) References Cited

FOREIGN PATENT DOCUMENTS

| | | |
|---|---|---|
| DE | 102012018057 A1 | 3/2014 |
| DE | 102013200562 A1 | 7/2014 |
| DE | 102013200726 A1 | 7/2014 |
| DE | 102013200786 A1 | 7/2014 |
| DE | 102013203102 A1 | 8/2014 |
| DE | 102013102501 A1 | 9/2014 |
| DE | 102013208996 A1 | 11/2014 |
| DE | 102013215082 A1 | 2/2015 |
| DE | 102013218674 A1 | 3/2015 |
| DE | 102014011609 A1 | 3/2015 |
| DE | 102014217188 A1 | 3/2015 |
| DE | 102013016797 A1 | 4/2015 |
| DE | 102013223357 A1 | 5/2015 |
| DE | 102014100334 A1 | 7/2015 |
| DE | 202015005208 U1 | 8/2015 |
| DE | 102014203715 A1 | 9/2015 |
| DE | 102014106949 A1 | 11/2015 |
| DE | 202014008335 U1 | 1/2016 |
| DE | 202014008336 U1 | 1/2016 |
| DE | 102014011727 A1 | 2/2016 |
| DE | 102014215164 A1 | 2/2016 |
| DE | 102014112596 A1 | 3/2016 |
| DE | 102014219644 A1 | 3/2016 |
| DE | 102014115051 A1 | 4/2016 |
| DE | 102014221167 A1 | 4/2016 |
| DE | 102014019696 A1 | 6/2016 |
| DE | 102014224545 A1 | 6/2016 |
| DE | 102015015504 A1 | 6/2016 |
| DE | 102015014337 A1 | 7/2016 |
| DE | 102015200636 A1 | 7/2016 |
| DE | 102015204216 A1 | 9/2016 |
| DE | 202016005333 U1 | 9/2016 |
| DE | 102015219558 A1 | 4/2017 |
| DE | 102015222171 A1 | 5/2017 |
| EP | 0705724 A2 | 4/1996 |
| EP | 0779668 A1 | 6/1997 |
| EP | 0780915 A1 | 6/1997 |
| EP | 1939028 A1 | 7/2008 |
| EP | 2298690 A1 | 3/2011 |
| EP | 2374646 A2 | 10/2011 |
| EP | 2388851 A1 | 11/2011 |
| EP | 2456003 A1 | 5/2012 |
| EP | 2467276 A1 | 6/2012 |
| EP | 2554420 A1 | 2/2013 |
| EP | 2562065 A1 | 2/2013 |
| EP | 2565958 A1 | 3/2013 |
| EP | 2581249 A1 | 4/2013 |
| EP | 2620997 A1 | 7/2013 |
| EP | 2626231 A2 | 8/2013 |
| EP | 2626232 A2 | 8/2013 |
| EP | 2626233 A2 | 8/2013 |
| EP | 2741343 A1 | 6/2014 |
| EP | 2758262 A1 | 7/2014 |
| EP | 2833436 A1 | 2/2015 |
| EP | 2913863 A1 | 9/2015 |
| EP | 2944493 A1 | 11/2015 |
| EP | 2990247 A1 | 3/2016 |
| EP | 3379598 A1 | 9/2018 |
| EP | 3382774 A1 | 10/2018 |
| FR | 2661281 A1 | 10/1991 |
| FR | 2705926 A1 | 12/1994 |
| FR | 2774044 B2 | 7/1998 |
| FR | 2774044 A1 | 7/1999 |
| FR | 2782399 A1 | 2/2000 |
| FR | 2861441 A1 | 4/2005 |
| FR | 2948072 A1 | 1/2011 |
| FR | 2949096 A3 | 2/2011 |
| FR | 2959454 A1 | 11/2011 |
| FR | 2961960 A1 | 12/2011 |
| FR | 2962076 A1 | 1/2012 |
| FR | 2975230 A1 | 11/2012 |
| FR | 2976731 A1 | 12/2012 |
| FR | 2982566 A1 | 5/2013 |
| FR | 2986374 A1 | 8/2013 |
| FR | 2986744 A1 | 8/2013 |
| FR | 2986910 A1 | 8/2013 |
| FR | 2986911 A1 | 8/2013 |
| FR | 2987000 A1 | 8/2013 |
| FR | 2987001 A1 | 8/2013 |
| FR | 2988039 A1 | 9/2013 |
| FR | 2990386 A1 | 11/2013 |
| FR | 2993511 A1 | 1/2014 |
| FR | 2994340 A1 | 2/2014 |
| FR | 2996193 A1 | 4/2014 |
| FR | 2998715 A1 | 5/2014 |
| FR | 2999809 A1 | 6/2014 |
| FR | 3000002 A1 | 6/2014 |
| FR | 3002910 A1 | 9/2014 |
| FR | 3007209 A1 | 12/2014 |
| FR | 3014035 A1 | 6/2015 |
| FR | 3019688 A1 | 10/2015 |
| FR | 3022402 A1 | 12/2015 |
| FR | 3028456 A1 | 5/2016 |
| GB | 2081495 A | 2/1982 |
| GB | 2353151 A | 2/2001 |
| GB | 2443272 A | 4/2008 |
| GB | 2483272 A | 3/2012 |
| GB | 2516120 A | 1/2015 |
| JP | 05193370 | 3/1993 |
| JP | H05193366 A | 8/1993 |
| JP | H05201356 A | 8/1993 |
| JP | H08268083 A | 10/1996 |
| JP | H08276752 A | 10/1996 |
| JP | H1075504 A | 3/1998 |
| JP | H10109548 A | 4/1998 |
| JP | H10149805 A | 6/1998 |
| JP | 2819927 B2 | 11/1998 |
| JP | H11178115 A | 7/1999 |
| JP | 2967711 B2 | 10/1999 |
| JP | 2000041303 A | 2/2000 |
| JP | 3085346 B2 | 9/2000 |
| JP | 3085346 B2 | 9/2000 |
| JP | 3199296 B2 | 8/2001 |
| JP | 3284850 B2 | 5/2002 |
| JP | 3284878 B2 | 5/2002 |
| JP | 3286634 B2 | 5/2002 |
| JP | 3489186 B2 | 1/2004 |
| JP | 2004142524 A | 5/2004 |
| JP | 2007331669 A | 12/2007 |
| JP | 2011006050 A | 1/2011 |
| JP | 2011049151 A | 3/2011 |
| JP | 2011152906 A | 8/2011 |
| JP | 2013133044 A | 7/2013 |
| KR | 20120030014 A | 3/2012 |
| KR | 20140007063 A | 1/2014 |
| KR | 101565980 B1 | 11/2015 |
| KR | 101565981 B1 | 11/2015 |
| KR | 20160001976 A | 1/2016 |
| KR | 20160055712 A | 5/2016 |
| KR | 20160087077 A | 7/2016 |
| KR | 101647825 B1 | 8/2016 |
| KR | 20160092902 A | 8/2016 |
| KR | 20160104867 A | 9/2016 |
| KR | 20160111231 A | 9/2016 |
| KR | 20160116383 A | 10/2016 |
| KR | 20170000325 A | 1/2017 |
| KR | 101704496 B1 | 2/2017 |
| KR | 20170052831 A | 5/2017 |
| KR | 20170062845 A | 6/2017 |
| KR | 20170065764 A | 6/2017 |
| KR | 20170065771 A | 6/2017 |
| KR | 20170065854 A | 6/2017 |
| KR | 20170070080 A | 6/2017 |
| KR | 1020170067240 A | 6/2017 |
| SE | 507909 C2 | 7/1998 |
| TW | 201425112 A | 7/2014 |
| TW | I467830 B | 1/2015 |
| TW | I482718 B | 5/2015 |
| WO | 0074964 A1 | 12/2000 |
| WO | 2006100005 A2 | 9/2006 |
| WO | 2006100006 A1 | 9/2006 |
| WO | 2008104356 A1 | 9/2008 |
| WO | 2008104358 A1 | 9/2008 |
| WO | 2008104376 A1 | 9/2008 |

(56) References Cited

FOREIGN PATENT DOCUMENTS

| | | |
|---|---|---|
| WO | 2008131935 A2 | 11/2008 |
| WO | 2009080151 A1 | 7/2009 |
| WO | 2009080166 A1 | 7/2009 |
| WO | 2009103462 A1 | 8/2009 |
| WO | 2010004192 A2 | 1/2010 |
| WO | 2010012337 A1 | 2/2010 |
| WO | 2010012338 A1 | 2/2010 |
| WO | 2010012342 A1 | 2/2010 |
| WO | 2010040520 A2 | 4/2010 |
| WO | 2010063365 A1 | 6/2010 |
| WO | 2010069713 A1 | 6/2010 |
| WO | 2010076053 A1 | 7/2010 |
| WO | 2010076055 A1 | 7/2010 |
| WO | WO-2010076452 A1 | 7/2010 |
| WO | 2011030041 A1 | 3/2011 |
| WO | 2011083980 A2 | 7/2011 |
| WO | 2011106851 A2 | 9/2011 |
| WO | 2011116801 A1 | 9/2011 |
| WO | 2011116959 A2 | 9/2011 |
| WO | 2011121757 A1 | 10/2011 |
| WO | 2011134815 A1 | 11/2011 |
| WO | 2011134828 A1 | 11/2011 |
| WO | 2012025710 A2 | 3/2012 |
| WO | 2012063025 A2 | 5/2012 |
| WO | 2012065853 A1 | 5/2012 |
| WO | 2012065855 A1 | 5/2012 |
| WO | 2012069349 A1 | 5/2012 |
| WO | 2012084132 A2 | 6/2012 |
| WO | 2012093233 A1 | 7/2012 |
| WO | 2012097514 A1 | 7/2012 |
| WO | 2012114040 A1 | 8/2012 |
| WO | 2012116608 A1 | 9/2012 |
| WO | 2012119424 A1 | 9/2012 |
| WO | 2012163504 A2 | 12/2012 |
| WO | 2013020707 A2 | 2/2013 |
| WO | 2013027982 A2 | 2/2013 |
| WO | 2013042628 A1 | 3/2013 |
| WO | 2013080008 A2 | 6/2013 |
| WO | 2013188680 A1 | 12/2013 |
| WO | 2014114511 A1 | 7/2014 |
| WO | 2014140412 A1 | 9/2014 |
| WO | 2014140463 A1 | 9/2014 |
| WO | 2014183995 A1 | 11/2014 |
| WO | 2014191651 A2 | 12/2014 |
| WO | 2015018658 A1 | 2/2015 |
| WO | 2015043869 A1 | 4/2015 |
| WO | 2015149660 A1 | 10/2015 |
| WO | 2016029084 A1 | 2/2016 |
| WO | 2016046144 A1 | 3/2016 |
| WO | 2016046145 A1 | 3/2016 |
| WO | 2016046146 A1 | 3/2016 |
| WO | 2016046147 A1 | 3/2016 |
| WO | 2016072822 A1 | 5/2016 |
| WO | 2016086274 A1 | 6/2016 |
| WO | 2016106658 A1 | 7/2016 |
| WO | 2016132280 A1 | 8/2016 |
| WO | 2016203130 A1 | 12/2016 |
| WO | 2017025592 A1 | 2/2017 |
| WO | 2017032571 A1 | 3/2017 |
| WO | 2017060608 A1 | 4/2017 |
| WO | 2017084938 A1 | 5/2017 |
| WO | 2017103449 A1 | 6/2017 |
| WO | WO-2018033880 A2 | 2/2018 |
| WO | 2018065554 A1 | 4/2018 |
| WO | 2018149762 A1 | 8/2018 |
| WO | WO-2018213475 A1 | 11/2018 |
| WO | WO-2019055658 A2 | 3/2019 |
| WO | WO-2019-071013 A1 | 4/2019 |

OTHER PUBLICATIONS

International Searching Authority (KR), International Search Report and Written Opinion for International Application No. PCT/IB2017/055002, dated Jul. 19, 2018.
International Searhcing Authority, International Search Report and Written Opinion for Application No. PCT/IB2018/050066, dated Apr. 26, 2018.
Korean Intellectual Property Office (ISA), International Search Report and Written Opinion for International Application No. PCT/US2018/033009, dated Sep. 11, 2018.
Korean Intellectual Property Office (ISA), International Search Report and Written Opinion for International Application No. PCT/US2018/032760, dated Sep. 11, 2018.
Korean Intellectual Property Office (ISA), International Search Report and Written Opinion for International Application No. PCT/US2018/050889, dated Mar. 21, 2019.

* cited by examiner

BATTERY TRAY FLOOR ASSEMBLY FOR ELECTRIC VEHICLES

CROSS-REFERENCE TO RELATED APPLICATION

This application claims benefit and priority under 35 U.S.C. § 119(e) of U.S. provisional application Ser. No. 62/568,051, filed Oct. 4, 2017, which is hereby incorporated herein by reference in its entirety.

TECHNICAL FIELD

The present invention generally relates to vehicle battery support structures, and more particularly to tray and floor structures for holding and supporting protected batteries, such as battery packs or modules or the like for electric and hybrid-electric vehicles.

BACKGROUND

Electric and hybrid-electric vehicles are typically designed to locate and package battery modules on the vehicle in a manner that protects the batteries from damage when driving in various climates and environments, and also that protects the batteries from different types of impacts. It is also fairly common for vehicle frames to locate batteries in a portion of the frame or sub-structure of the vehicle, such as between the axles and near the floor of the vehicle, which can distribute the weight of the batteries across the vehicle frame and establish a low center of gravity for the vehicle.

SUMMARY

A battery tray for an electric vehicle has a floor that spans below the batteries held in a battery containment area. The floor is provided as a tray floor assembly that may be engineered or configured to reduce the weight of the overall battery tray, while also providing the desired structural support to the contained batteries and the desired protective attributes, such as impact resistance to the lower surface the battery tray. The tray floor assembly has elongated tray sections that may be extruded, such as with aluminum, or pultruded, such as with a resin and composite substrate, to form a cross-sectional profile that is substantially consistent longitudinally along the length of each tray section. The elongated tray sections may be attached or otherwise arranged together in a manner so as to form a floor structure with a varied cross-sectional profile across a width of the tray, such as to have structural mass at the desired locations of the floor structure to support loads of the vehicle batteries arranged over the floor of the battery tray. Also, exterior or outboard tray sections of the floor assembly may include a wall portion that extends longitudinally along the exterior or outboard tray section to provide a section of a peripheral wall structure of the battery tray. The wall structure section or sections provided by the floor assembly may further have wall thicknesses and longitudinal elongated hollow areas that are configured to laterally protect the battery containment area, such as to prevent lateral impact forces from objects hitting the vehicle from substantially penetrating the battery containment area.

According to one aspect of the present disclosure, a vehicle battery tray has a floor assembly with elongated tray sections that attach together at lateral edge portions of adjacent tray sections of the elongated tray sections to form a floor structure. This floor structure is configured to support vehicle batteries contained in the vehicle battery tray. The elongated tray sections each have a substantially consistent cross-sectional shape that extends longitudinally along a length of the elongated tray sections. A thickness of one of the elongated tray sections at a central area of the floor structure is greater than a thickness of another one of the elongated tray sections at an outboard area of the floor structure. The central area of the floor structure may further be configured to withstand an equal or greater transverse bending moment than the outboard area of the floor structure.

According to another aspect of the present disclosure, a tray floor assembly for a vehicle battery tray has elongated tray sections that attach together to form a substantially planar floor structure that is configured to support vehicle batteries. The elongated tray sections each extend longitudinally and parallel relative to each other and each have a transverse cross-sectional profile that is substantially consistent longitudinally along its length. The cross-sectional profile of at least one of the elongated tray sections includes a thickness between an upper surface and a lower surface of the floor structure that increases laterally across a width of the cross-sectional profile. At least one of the elongated tray sections may also have an upper panel portion that at least partially forms the upper surface of the floor structure and a lower panel portion that is separated from the upper panel portion to provide a hollow area extending longitudinally along the length of the respective tray section. The upper panel portion may be supported away from the lower panel portion by intermediate stiffening members that integrally interconnect between the upper and lower panel portions, so as to laterally divide the hollow area disposed therebetween.

According to yet another aspect of the present disclosure, a battery tray for an electric vehicle includes elongated tray sections that extend longitudinally and together to form a floor structure of the battery tray that has a substantially planar upper surface that is configured to support batteries that supply operational power to the electric vehicle. The elongated tray sections include outer tray sections on opposing lateral sides of the floor structure that each have a wall portion that partially forms a peripheral wall structure that surrounds a battery containment area of the vehicle battery tray. The elongated tray sections may also include an inner tray section that is disposed between the outer tray sections and that has a thickness defined between the upper surface and a lower surface of the floor structure that is greater than a thickness of the floor structure at the outer tray sections.

Furthermore, when in an initially formed state, adjacent tray sections of a battery tray assembly may be integrally interconnected, such that these adjacent tray sections may be displaced from the initially formed state to an assembly state for arranging the adjacent tray sections with the respective upper surfaces in substantially planar alignment with each other to form the floor structure of the battery tray.

These and other objects, advantages, purposes, and features of the present disclosure will become apparent upon review of the following specification in conjunction with the drawings.

DETAILED DESCRIPTION

Figure 1:
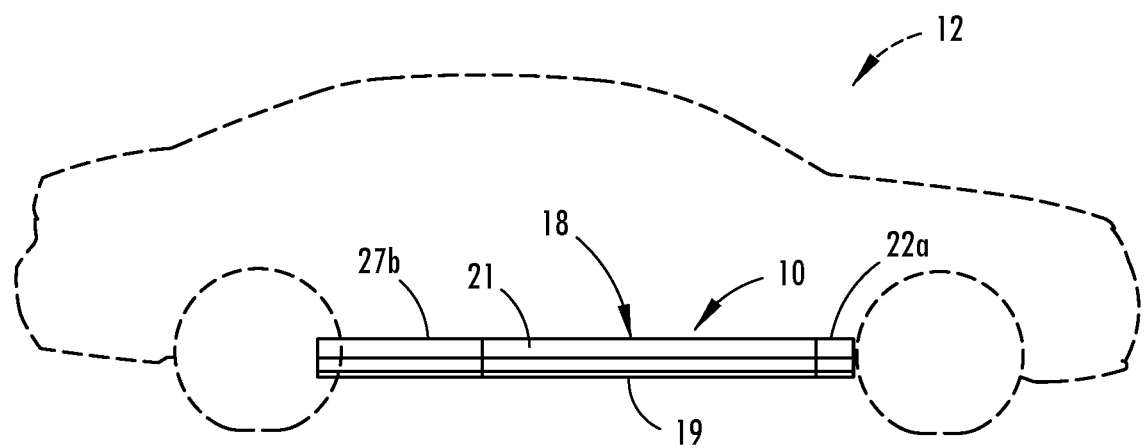
FIG. 1 is a side elevational view of a battery support structure secured at a mounting location on a vehicle.

Referring now to the drawings and the illustrative embodiments depicted therein, a vehicle battery tray or structure 10 is provided for supporting and protecting batteries, such as battery packs or modules or the like, for operating a vehicle 12 (FIG. 1), such as for operating of an electric vehicle or hybrid-electric vehicle. The battery tray 10 may be attached or mounted at or near the lower frame or rocker rails 14 of the vehicle 12 (FIG. 2), so as to locate the contained batteries 16 generally in a central location on the vehicle 12, which is generally away from probable impact locations and also in a location that may evenly distribute the weight of the batteries 16 over the vehicle frame. Such an attachment or mounting location at the bottom area of the vehicle frame may also provide the vehicle with a relatively lower center of gravity. The battery tray 10 spans below the vehicle 12, such as shown in FIG. 1, with a generally thin profile, so as to accommodate various vehicle body types and designs. For further usage considerations, it is contemplated that the battery tray 10 may be easily disengaged or detachable from the rocker rails 14 of the vehicle 12, such as for replacing or performing maintenance on the batteries 16 or related electrical components.

Figure 4:
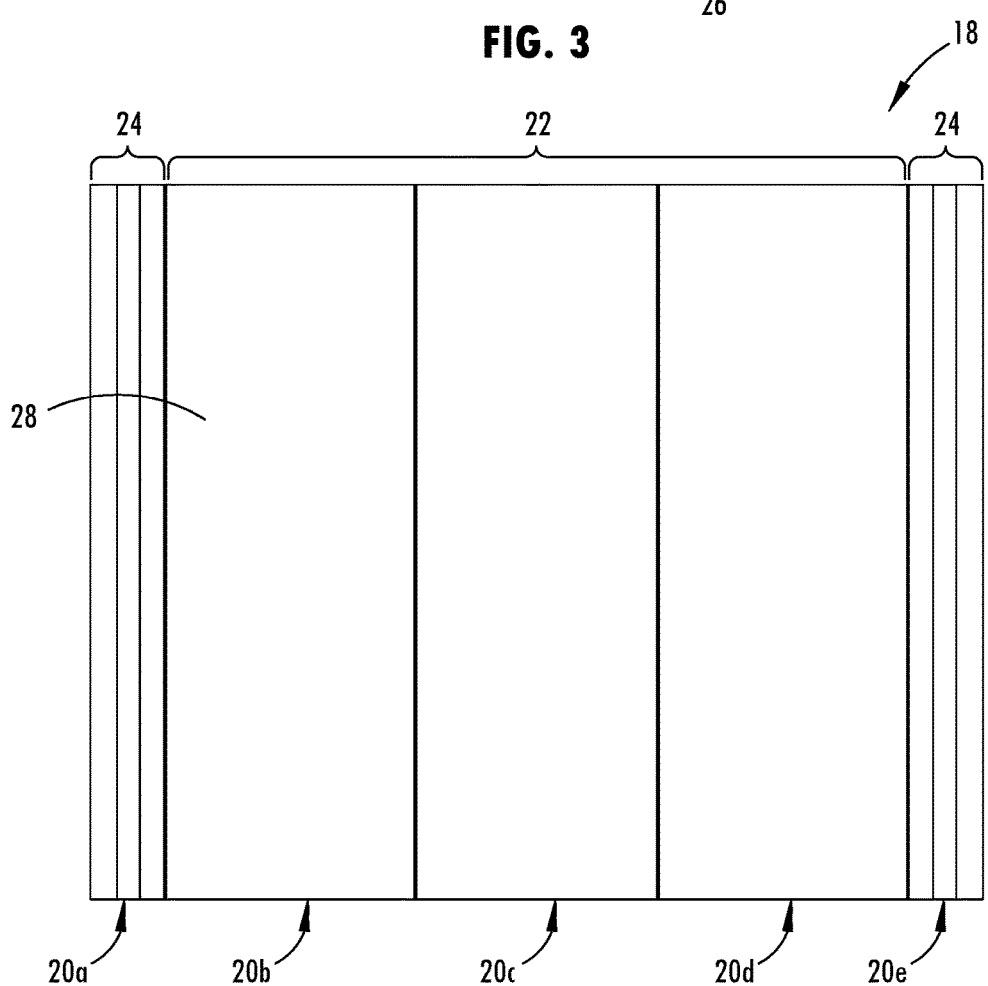
FIG. 4 is a top plan view of the tray floor assembly shown in FIG. 3.

The battery tray 10 includes a battery tray floor assembly 18 that spans below the batteries 16 contained in the battery tray 10, so as to at least partially form an interior surface of a battery containment area of the battery tray 10. Moreover, such as shown in FIG. 1, a bottom surface 19 of the floor assembly 18 of the battery tray 10 may be exposed to generally provide an undercarriage surface of the vehicle body that faces and is suspended away from the road or ground surface. The tray floor assembly 18 has elongated tray sections that are attached or otherwise arranged together in a manner to form a floor structure 22 of the battery tray 10, such as shown in FIG. 4. The floor structure 22 formed by the tray sections provide the desired structural support to the contained batteries 16 and the desired protective attributes, such as impact resistance to the lower surface 19 the battery tray 10.

As shown in FIGS. 2-6, the tray floor assembly 18 of the battery tray 10 provides five separate tray sections 20a, 20b, 20c, 20d, 20e that extend longitudinally in parallel alignment with each other and are attach together at lateral edge portions of adjacent tray sections to form the floor structure 22. These elongated tray sections 20a, 20b, 20c, 20d, 20e are formed to each have a cross-sectional profile taken transverse to the longitudinal length that is substantially consistent longitudinally along the length of each tray section. Such a generally consistent profile along the length of a tray section may be formed by extrusion, such as with an aluminum alloy, or pultrusion, such as with a resin and composite substrate. For example, the tray sections may be extruded with 6xxx or 7xxx series aluminum alloy or pultruded with carbon fiber strands and mats reinforced with a resin system. It is understood that a tray floor assembly may have more or fewer tray sections than shown in FIGS. 3-6, such as shown in the additional illustrated examples herein, and furthermore understood that tray sections may be formed separate from each other or integrally formed together, as described in examples below. In addition to the different exemplary structural configurations shown and described below, it is understood that other conceivable structural designs may be used to provide the varied floor structure 22 for the desired structural performance characteristics.

Figure 2:
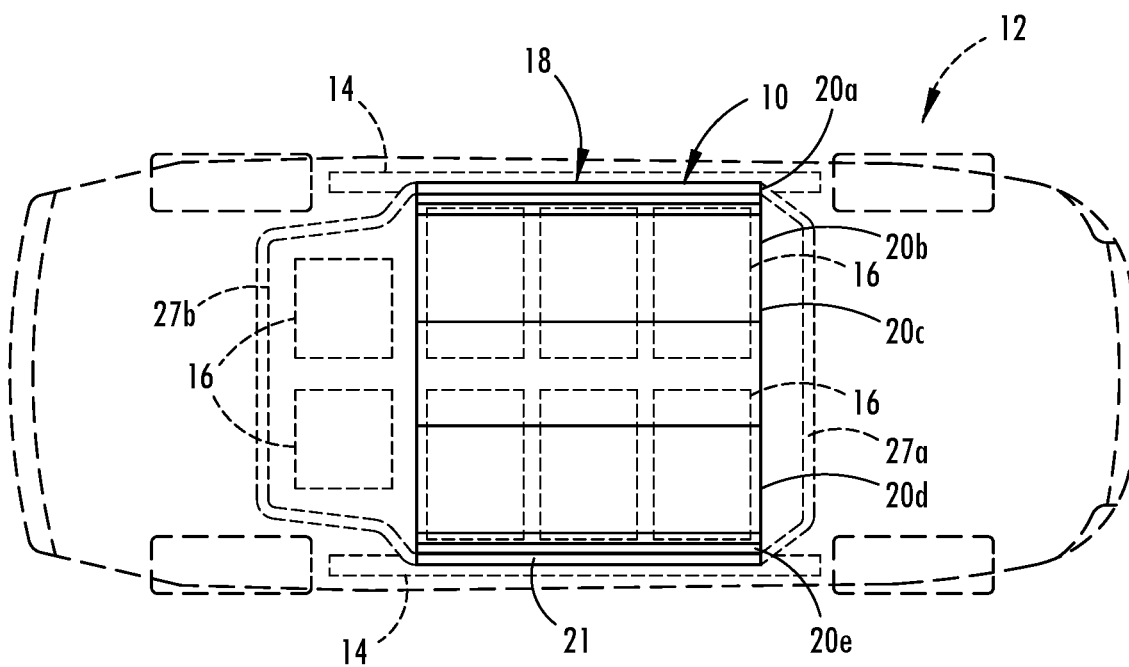
FIG. 2 is top plan view of the battery support structure shown in FIG. 1, illustrating rocker rails and other portions of the vehicle in dashed lines.
Figure 3:
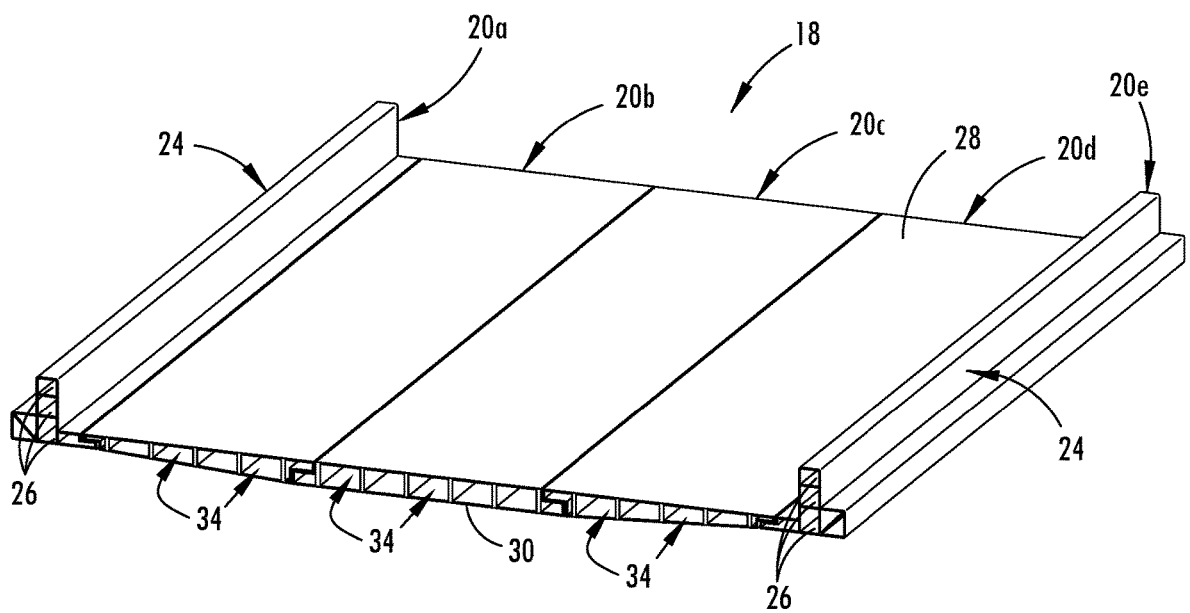
FIG. 3 is an upper perspective view of a tray floor assembly of the battery support structure shown in FIG. 1.

The open front and rear ends of the tray floor assembly 18 may be enclosed with structural modules or cross members to further protect the batteries 16 held in the containment area and provide the desired peripheral shape of the battery tray 10. As shown in FIGS. 1 and 2, the vehicle battery tray 10 has front and rear tray enclosure members 27a, 27b that extend laterally across the tray floor assembly 18 and attach at the wall portions of the outer tray sections 20a, 20e to together form a peripheral wall structure 21 that surrounds the battery containment area of the vehicle battery tray 10. The front and rear tray enclosure members 27a, 27b may engage within the hollow openings of the wall portions of the outer tray sections and may attach thereat via welding, adhesive, and/or fasteners, and other conceivable means of attachment. Moreover the front and rear tray enclosure members 27a, 27b may be part of a module that includes a floor section that aligns with the floor assembly 18 and is capable of supporting additional batteries, such as shown in FIG. 2.

Figure 5:
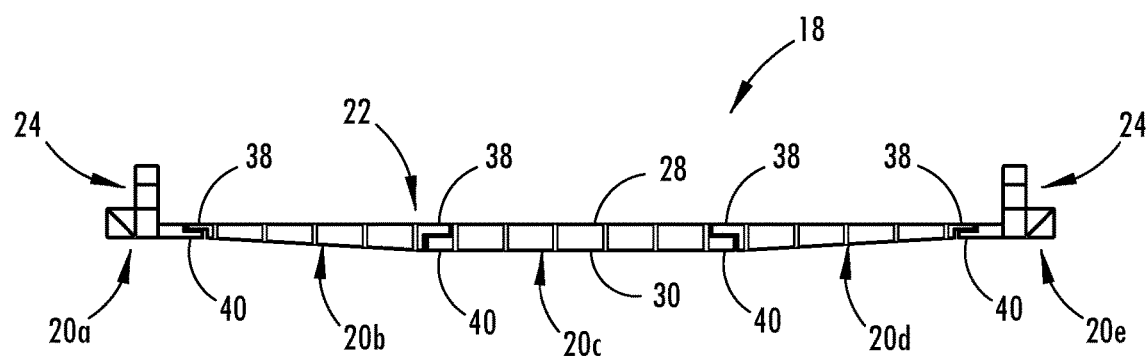
FIG. 5 is an end elevational view of the tray floor assembly shown in FIG. 3.
Figure 5A:
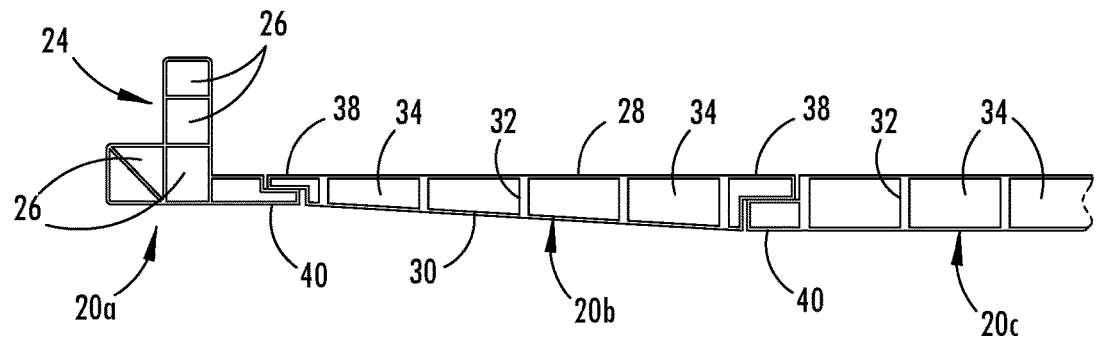
FIG. 5A is an enlarged view of an outer section of the tray floor assembly shown in FIG. 5.
Figure 5B:
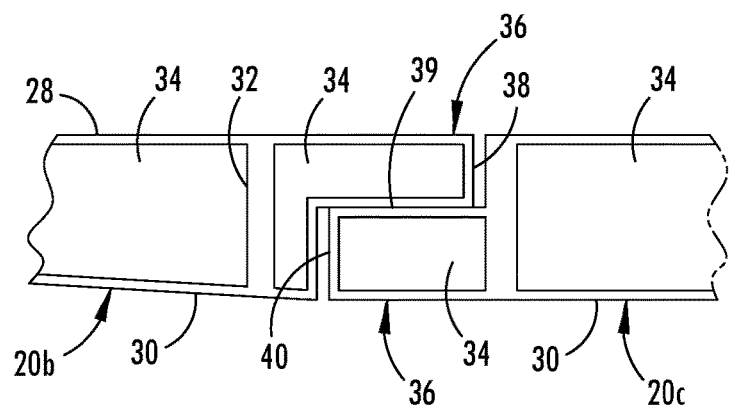
FIG. 5B is an enlarged view of a lap joint of the tray floor assembly shown in FIG. 5A, showing an attachment interface between elongated tray sections.

The cross-sectional profile of one or more of the tray sections may be engineered or otherwise configured with the desired structure to support the loads of the vehicle batteries 16 and/or other related contents of the battery tray 10 at the respective tray section, such that the structural shape and design of the floor structure 22 may vary across the tray floor assembly 18. As shown in FIGS. 5-5B, the tray sections 20a, 20b, 20c, 20d, 20e may each have an upper panel portion 28 and a lower panel portion 30 that are separated from each other by intermediate members 32 that interconnect the upper and lower panel portions 28, 30 and consistently extend longitudinally along the length of the respective tray section. Accordingly, hollow areas 34 may be defined between the upper and lower panel portions 28, 30 that also extend longitudinally along the intermediate members 32, so as to laterally separate the hollow areas 34 from each other and vertically separate the upper and lower panel portions 29, 30 from each other.

The vertical spacing provided by the hollow areas 34 creates a distance to allow upward deformation of the lower panel portion 30 before impacting or substantially deforming the upper panel portion 28, such that impact resistance and an upward deformation range is provided at the bottom surface 19 of the battery tray 10. Further, the intermediate members 32 may be arranged at different distances or spacing from each other to increase the load capacity of the floor portion 22 of the tray 10 at the desired areas, such as at or near a central area laterally across the width of the tray. It is contemplated that in additional embodiments the intermediate members may be differently spaced and shaped, such as to extend at an angle between the upper and lower panel portions.

Moreover, as shown in FIG. 5, the tray sections of the tray floor assembly 18 have a varied cross-sectional profile across a width of the tray 10, such as to have structural mass at the desired cross-sectional locations of the floor structure 22 to support loads of the vehicle batteries arranged over and supported at the floor of the battery tray 10. The varied thickness provides an inner tray section 20c with a greater thickness than exterior tray sections 20a, 20e. Intermediate tray sections 20b, 20d are disposed outboard from the inner tray section 20c and inward from the outer tray sections 20a, 20e, such that the intermediate tray sections 20b, 20d connect between the exterior and inner tray sections 20a, 20c, 20e. The illustrated intermediate tray sections 20b, 20d have a tapering thickness that decrease at a generally consistent rate or slope from the inner tray section 20c to the exterior tray sections 20a, 20e. The upper panel portions 28 of the tray sections are generally arranged in horizontal alignment, such that the varied thickness of the intermediate tray sections 20b, 20d is provided an angle of the lower panel portion 30 and varied lengths of the intermediate members 32 integrally extending between the upper and lower panel portions 28, 30.

To attach the tray sections 20a-20e together in forming the tray 10, each tray section may include an attachment feature 36 that engages and couples with a corresponding attachment feature 36 of an adjacent tray section at a longitudinal seam between the tray sections. As shown in FIG. 5B, the attachment feature of one tray section 20b includes an upper flange 38 having horizontal attachment surface that extends longitudinally along an inside edge portion of the tray section 20a. The upper flange 38 may protrude laterally in alignment with the upper panel portion 28 and may provide the horizontal attachment surface generally between the upper and lower panel portions 28, 30 so as to be spaced at a generally central vertical location. Accordingly, the attachment feature 36 of the tray section 20c adjacent to the tray section 20b may include an opposite and corresponding lower flange 40 that protrudes laterally in alignment with the lower panel portion 30 to similarly centrally position a horizontal attachment surface that consistently extends longitudinally along the edge portion. The horizontal surfaces of the upper and lower flanges 38, 40 attach in abutting contact at an interface 39, such as to form a lap joint between the tray sections 20b, 20c. The flanges and attachment features may be shaped to mate and engage with each other in a close and tight fitting manner, and thus it is contemplated that attachment flanges in additional embodiment may have various surface orientations and shapes.

Figure 6:
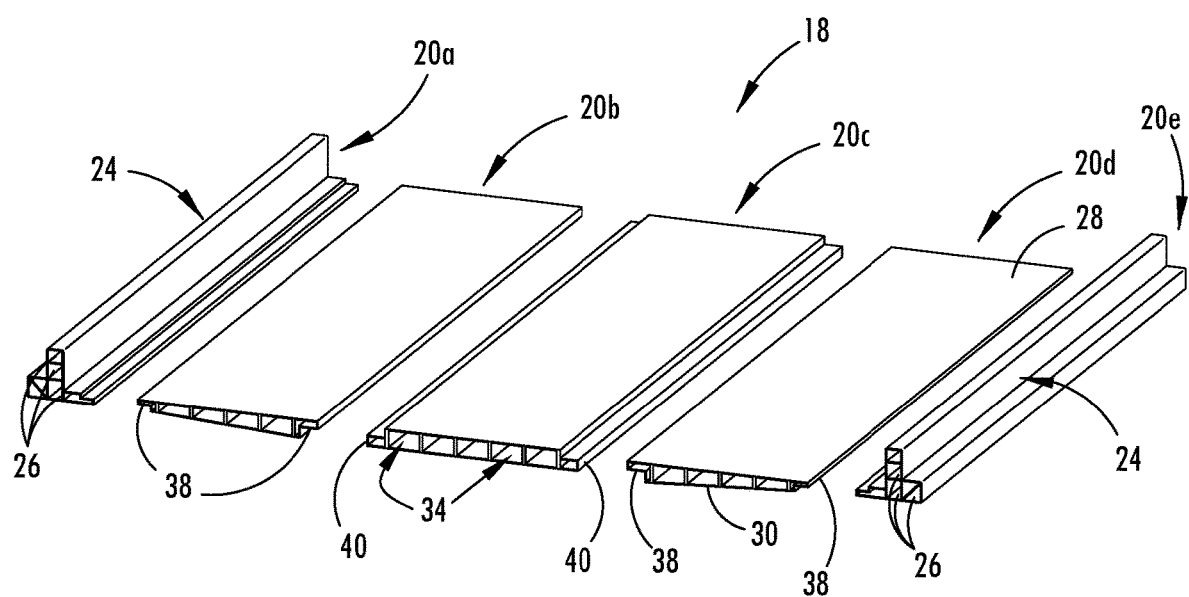
FIG. 6 is an exploded upper perspective view of the elongated tray sections of the tray floor assembly shown in FIG. 3.

When engaged, the upper and lower surfaces of the adjacent tray sections are generally aligned and flush, such as illustrated with each of the tray sections shown in FIG. 5B. The attachment features 36 may provide both a structural connection for interlocking the tray sections and a tight fitting or seal that is configured to prevent moisture intrusion into the containment area of the battery tray. In addition to or in the alternative to the mechanical interface provided by the engaged attachment features, it is contemplated that the interface between the tray sections may be attached with welding, adhesive, and/or fasteners or the like. As shown in FIG. 6, the tray sections may be attached to each other via the mating of the attachment features 36, such as by attaching each tray sections separately or by simultaneously attaching the tray sections. During or after engaging the attachment features 36 together, such as with the horizontal surfaces of the flanges in abutting contact, additional welding, adhesive, and/or fasteners or the like may be disposed at the connection interface to secure the longitudinal seam. The welding of such a connection may be performed by laser welding, friction stir welding, MIG welding or the like.

The exterior or outboard tray sections 20a, 20e of the floor assembly 18 may include a wall portion 24 that extends longitudinally along the respective tray section to provide a section of a peripheral wall structure 21 of the battery tray 10. The wall structure 24 provided by the floor assembly may further have wall thicknesses and longitudinal elongated hollow areas 26 that are configured to laterally protect the battery containment area, such as to prevent lateral impact forces to the vehicle from substantially penetrating the battery containment area.

The outer edges of the battery tray 10 are generally defined by a perimeter wall 21 that surrounds the floor portion 22 of the tray to form a protective barrier that encloses the batteries 16 in the battery tray 10. The opposing exterior tray sections may each includes a wall portion 24 that is integrally formed with and protrudes upward form floor portion 22. The two exterior tray sections 20a, 20e shown in FIGS. 3 and 4 include wall portions 24 formed at an outer edge area of the floor portion 22 and that include an upright interior surface extending integrally from the upper surface of the floor portion 22. As such, the exterior tray sections 20a, 20e may provide a seamless transition or impermeable interface between the floor portion 22 and the wall portion 24 so as to prevent moisture from entering the interior area of the tray 10. The wall portion 24 may also include one or more hollow areas 26 extending longitudinally along the exterior tray section 20a, 20c to provide a tubular structure that may function as a side reinforcement member of the battery tray 10 that is configured to absorb and prevent intrusion from lateral impact forces to the vehicle. The wall portion 24 of the exterior tray sections 20a, 20e may include various cross-sectional profile shapes, thicknesses, hollow area configurations and the like so as to be configured for the desired vehicle application.

Figure 7:
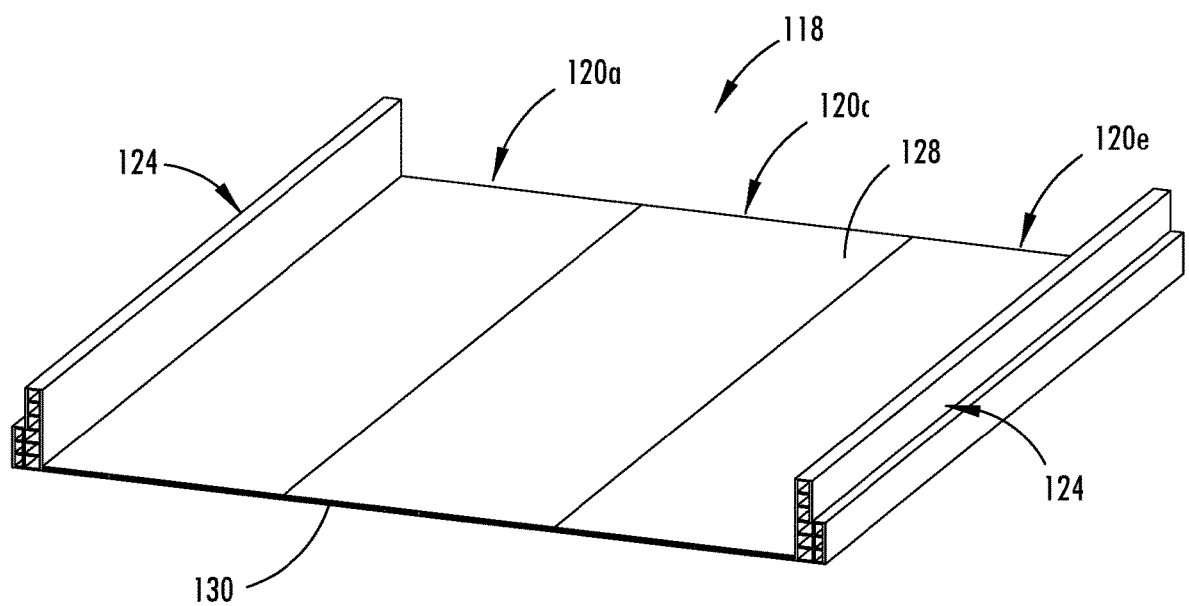
FIG. 7 is an upper perspective view of an additional embodiment of a battery tray floor assembly.
Figure 8:
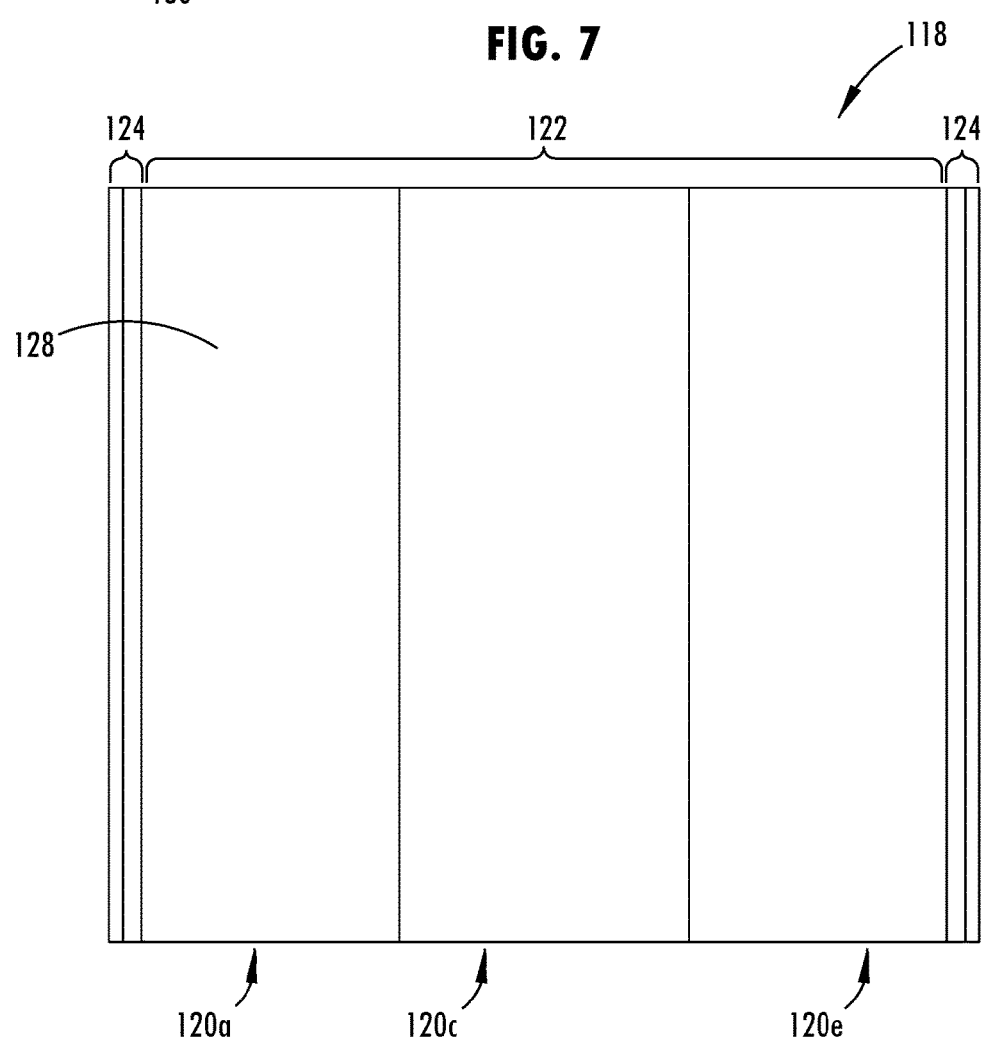
FIG. 8 is a top plan view of the tray floor assembly shown in FIG. 7.

Referring now to an additional example shown in FIGS. 7-10, the battery tray floor assembly 118 has a floor structure 122 with a generally consistent thickness. As shown in FIG. 9B, the attachment feature 136 of one tray section 120a includes a channel 138 that extends longitudinally along an inside edge portion of the tray section 120a. The channel 138 may be generally defined between the upper and lower panel portions 128, 130 so as to be spaced at a generally central vertical location. Accordingly, the attachment feature 136 of the tray section 120c adjacent to the exterior tray section 120a may include a protrusion 140 that protrudes laterally from a generally central vertical location on the edge portion of the tray section 120c, and similarly the protrusion 140 may consistently extend longitudinally along the edge portion. The shape of the protrusion 140, such as the thickness and lateral extension, is generally configured to mate and engage with the channel 138 in a close or tight fitting manner, and thus it is contemplated that various protrusion and channel shapes are contemplated.

Figure 9:
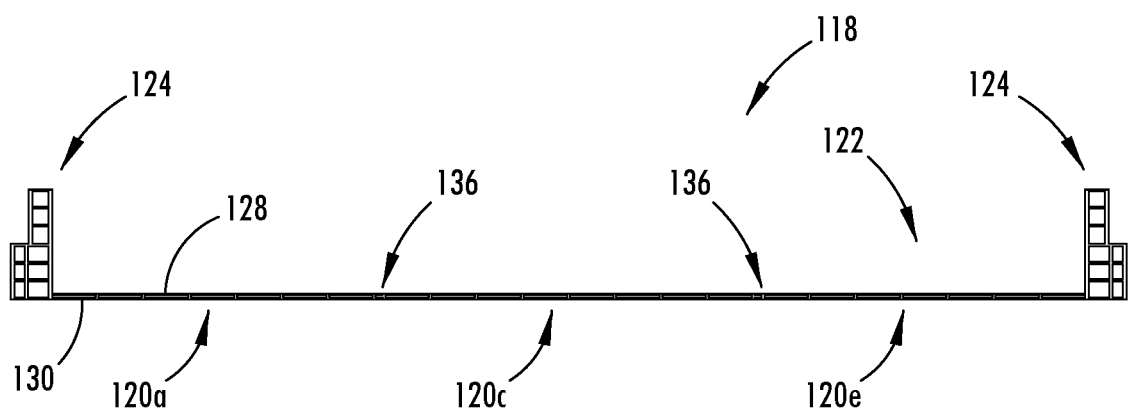
FIG. 9 is an end elevational view of the tray floor assembly shown in FIG. 7.
Figure 9A:
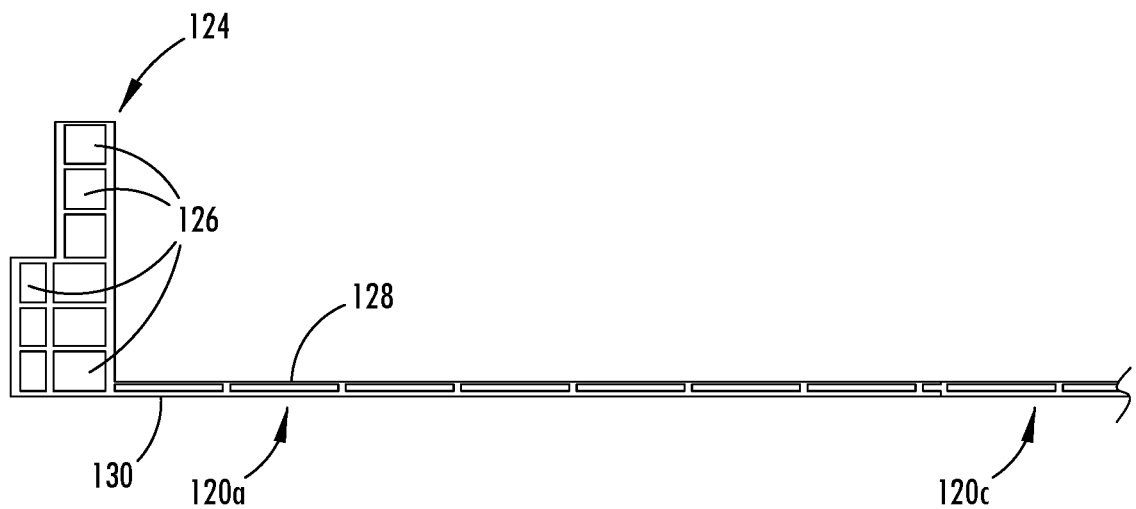
FIG. 9A is an enlarged view of an outer section of the tray floor assembly shown in FIG. 7.
Figure 9B:
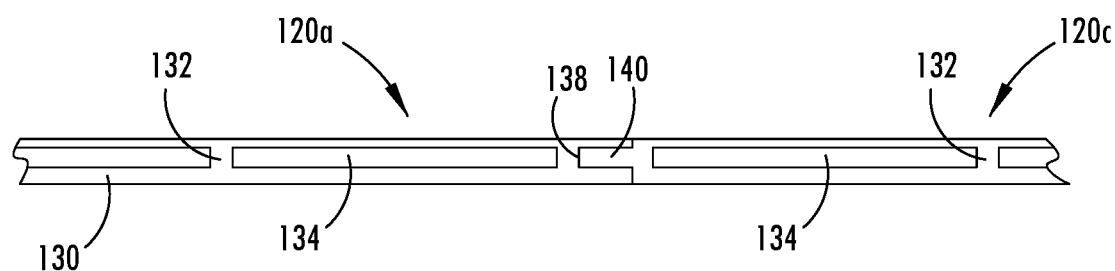
FIG. 9B is an enlarged view of a lap joint of the tray floor assembly shown in FIG. 9A, showing an attachment interface between elongated tray sections.
Figure 10:
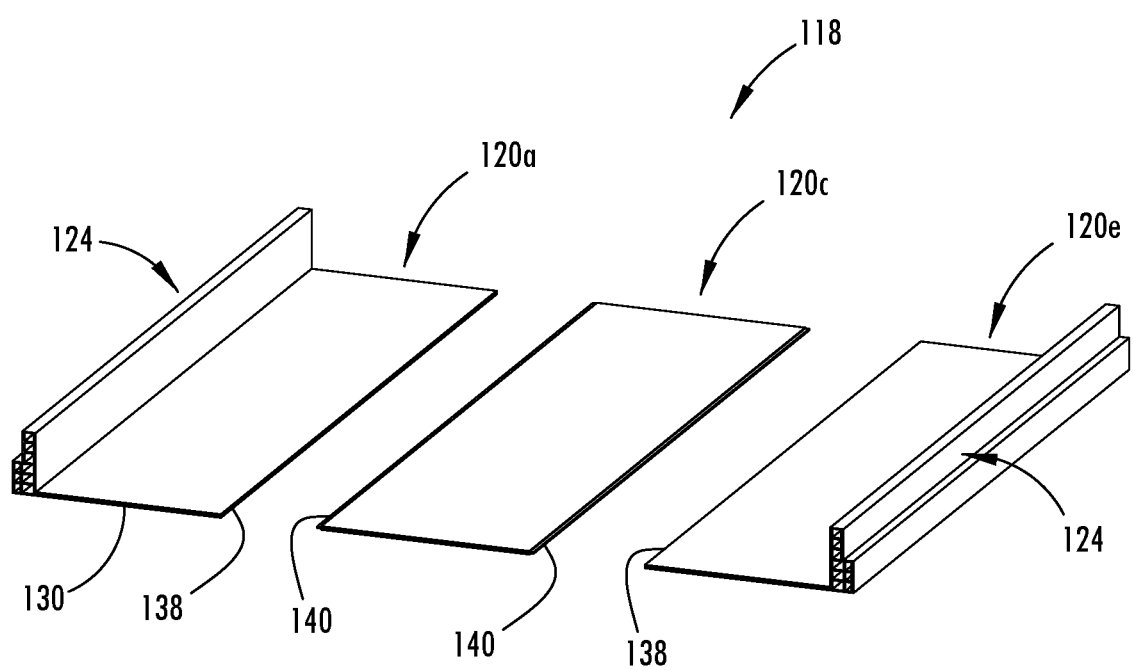
FIG. 10 is an exploded upper perspective view of the elongated tray sections of the tray floor assembly shown in FIG. 7.

When engaged, the upper and lower surfaces of the adjacent tray sections 120a, 120c, 120e are generally aligned and flush, as shown in FIGS. 9-9B. The attachment features 136 may provide both a structural connection for interlocking the tray sections and a tight fitting or seal that is configured to prevent moisture intrusion into the containment area of the battery tray. In addition to or in the alternative to the mechanical interface provided by the engaged attachment features, it is contemplated that the interface between the tray sections may be attached with welding, adhesive, and/or fasteners or the like. As shown in FIGS. 6-8, one of the exterior tray sections 120a, 120e may be attached to the interior tray section 120c via the matting of the attachment features 136, and subsequently or simultaneously, the remaining exterior tray section may be attached to the opposing side of the interior tray section 120c via the corresponding attachment features 136. During or after interlocking or engaging the attachment features 136 together, such as with the protrusion 140 disposed in the channel 138, the additional engagement features, such as welding, adhesive, and/or fasteners or the like may be disposed at the connection. Features of the tray floor assembly 118 that are similar to the battery tray floor assembly 18 described above may not be described in detail again, and similar reference numbers may be used, incremented by 100.

Figure 11:
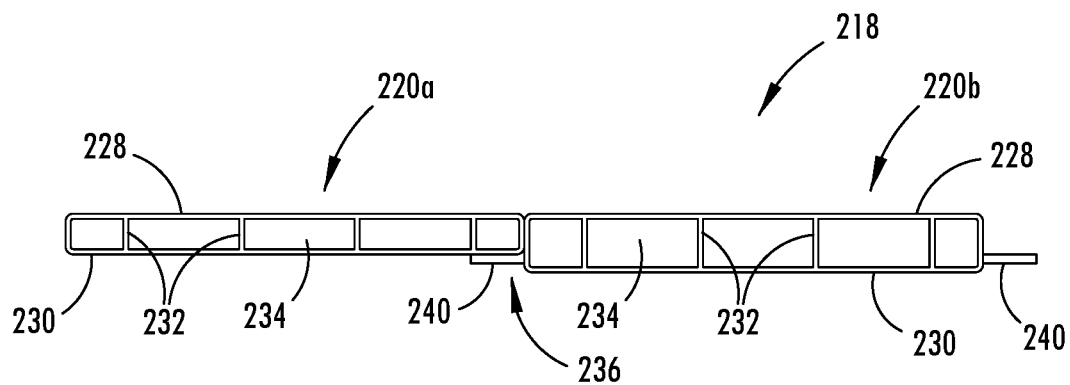
FIG. 11 is a cross-sectional view of an additional embodiment of a battery tray floor assembly, showing two tray sections.

Referring now to an additional example shown in FIG. 11, the battery tray floor assembly 218 has a floor structure with a varied thickness, where an inner tray section 220b has a greater thickness than an exterior tray section 220a, such that a central area of the floor portion of the battery tray is configured to support the loads distributed by the batteries contained in the battery tray. The illustrated the exterior and inner tray sections 220a, 220b each have an upper panel portion 228 and a lower panel portion 230 that are separated from each other by intermediate members 232 that interconnect the upper and lower panel portions 228, 230 and consistently extend longitudinally along the length of the respective tray section. Also, hollow areas 234 are defined between the upper and lower panel portions 228, 230 that also extend longitudinally along the intermediate members 232, so as to laterally separate the intermediate members 232 from each other and vertically separate the upper and lower panel portions 228, 230 from each other. The vertical separation provided by the intermediate members 232 at inner tray section 220b is greater than the vertical spacing provided at exterior tray section 220a.

With further reference to FIG. 11, the tray sections 220a, 220b are attached together using an attachment feature 236 that engages and couples with a corresponding attachment feature 236 of an adjacent tray section at a longitudinal seam between the tray sections. The illustrated attachment feature of the inner tray section 220b includes a protrusion 240 that protrudes generally laterally outward from the edge portion of the tray section 220b and that extends longitudinally along the edge portion of the tray section 220b. The corresponding edge portion of the exterior tray section 220a has a lower surface that rests on an upper surface of the protrusion 240 to provide the engagement between the adjacent tray sections 220a, 220b. The interface between the upper and lower surfaces at the respective protrusion 240 and engagement feature 236 of the exterior tray section 220a may be used for additional attachment means, such as welding, adhesive, and/or fasteners or the like. Features of the tray floor assembly 218 that are similar to the battery tray floor assembly 18 described above may not be described in detail again, and similar reference numbers are used, incremented by 200.

Figure 12:
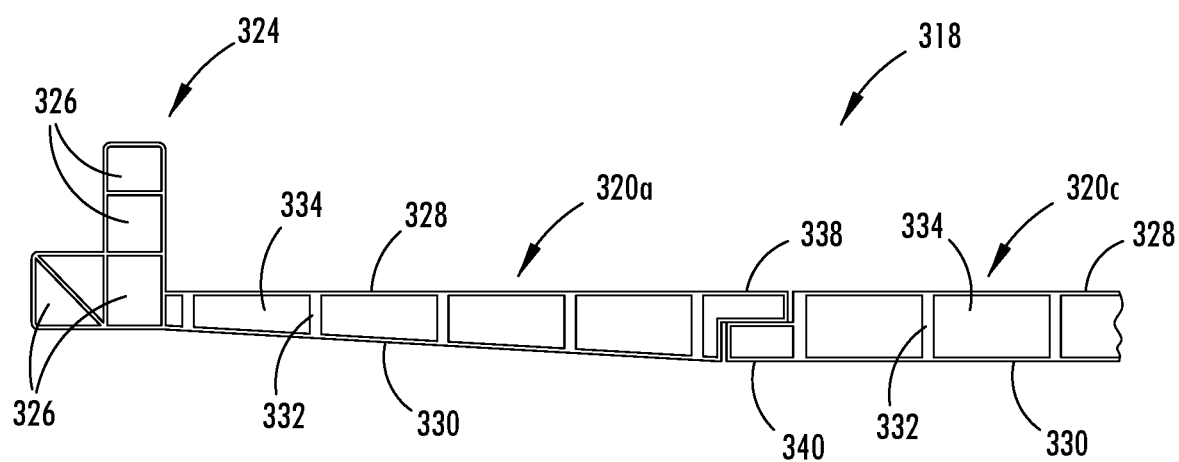
FIG. 12 is a cross-sectional view of an additional embodiment of a battery tray floor assembly, showing two tray sections.

A further example is shown in FIG. 12, where the battery tray floor assembly 318 has a varied cross-sectional thickness. Specifically, an inner tray section 320c has a greater thickness than exterior tray sections 320a. The illustrated exterior tray section 320a has a tapering thickness that decrease at a generally consistent rate or slope from the inner tray section 320c toward an integrally formed wall portion of the exterior tray sections 320a. The floor portion of the illustrated tray sections 320a, 320c each have an upper panel portion 328 and a lower panel portion 330 that are separated from each other by intermediate members 332 that interconnect the upper and lower panel portions 328, 330 and consistently extend longitudinally along the length of the respective tray section. Also, hollow areas 334 are defined between the upper and lower panel portions 328, 330, such that the intermediate members 332 laterally separate the hollow areas 334 from each other and vertically support the upper and lower panel portions 328, 330 from each other.

The exterior tray section 320a, as shown in FIG. 12, includes a wall portion 324 formed at an outer edge area of the floor portion of the exterior tray section 320a and that includes an upright interior surface extending integrally from the upper surface of the upper panel portion 328 of the exterior tray section 320a. It is understood that an additional exterior tray section may be attached at the opposing edge of the inner tray section 320c from the exterior tray section 320a shown in FIG. 12. The wall portions 324 of such an embodiment also include hollow areas 326 extending longitudinally along the exterior tray section 320a to provide a tubular structure that may function as a side reinforcement member of the battery tray that is configured to absorb and prevent intrusion from lateral impact forces to the vehicle. The exterior tray section 320a of the floor portion 322 shown as a single integral pieces of the parts that are of shown separately in FIGS. 3-6 as the intermediate tray sections 20b, 20d and the exterior tray section 20a, 20e of the floor assembly 18. Features of the tray floor assembly 318 that are similar to the battery tray floor assembly 18 described above may not be described in detail again, and similar reference numbers are used, incremented by 300.

As also illustrated in FIG. 12, the tray sections attach together using an attachment feature 336 that engages and couples with a corresponding attachment feature 336 of an adjacent tray section at a longitudinal seam between the tray sections. The illustrated attachment feature of the inner tray sections 320b include a lower protrusion or flange 340 that protrudes laterally from a lower edge portion of the tray section 320c and that extends longitudinally along the edge portion of the tray section. The corresponding edge portion of the exterior tray section 320a has an upper protrusion or flange 338 that extends from an upper edge portion of the tray section 320a and that rests on an upper surface of the flange 340 to provide the engagement between the adjacent tray sections. The interface between the respective flanges 338, 340 may include additional attachment means, such as welding, adhesive, and/or fasteners or the like.

When forming the tray sections of the battery tray floor assembly, the adjacent tray sections may be formed together, such as by a single extrusion die, so as to increase tray section production speed and the ease of assembly, among other benefits. For example, extrusion dies may be limited in size or diameter, such as to approximately 12 to 16 inches, whereby it may be desirable to package multiple tray sections into a single extrusion die. When in an initially formed state, at least two of the tray sections may thereby be integrally interconnected with each other, such that one or more interconnecting pieces or portions may be deformed to align and attach the tray sections and/or may be removed so as to allow the tray sections to subsequently attach together.

Figure 13A:
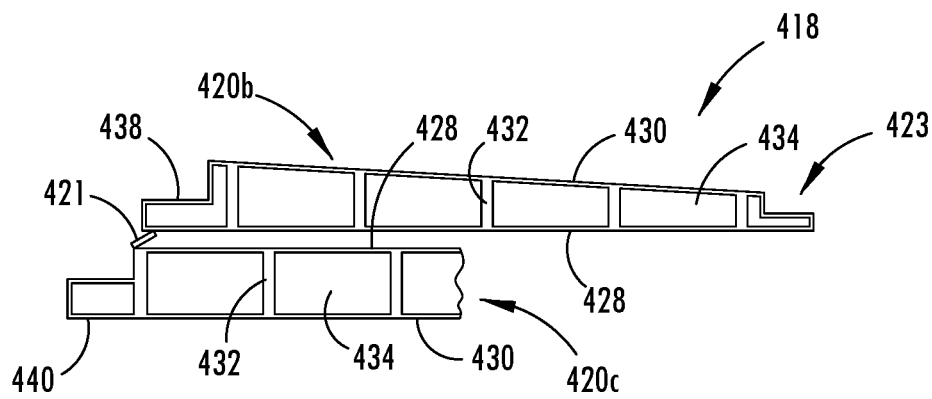
FIG. 13A is a cross-sectional view of an additional embodiment of a battery tray floor assembly, showing two tray sections in a formed state.
Figure 13B:
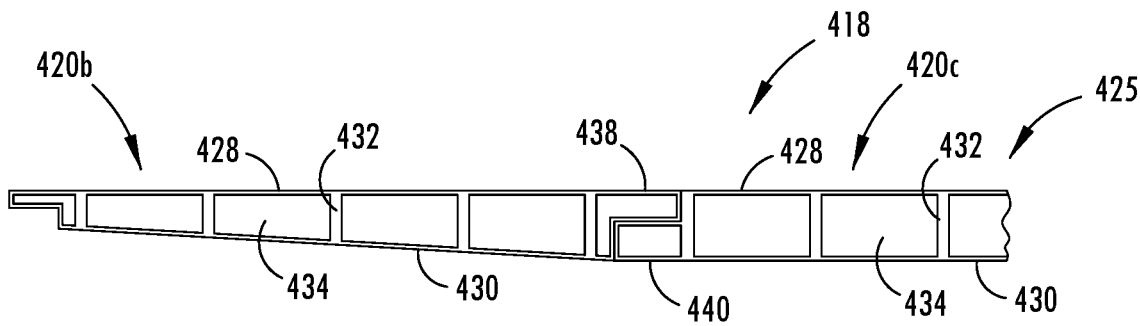
FIG. 13B is a cross-sectional view of the battery tray floor assembly of FIG. 13A, showing the two tray sections in a use state.

As shown in FIGS. 13A and 13B, an outer tray section 420b is extruded simultaneously with an inner tray section 420c with an interconnecting piece 421 connecting between the edge portions at the upper panel portions 428 of each tray section 420b, 420c and extending longitudinally along the tray sections. With the interconnecting piece 421 intact, as shown in FIG. 13A, the tray sections may be considered to be in an initially formed state 423. From the initially formed state 423, the interconnecting piece 421 may be cut from or otherwise removed from the edge portions of both try sections, such that the tray sections may then be attached, similar to the tray sections 20b, 20d shown in FIGS. 3-6 and described herein. When attached, the tray sections may be considered to be in a use state 425 forming a substantially planar structure that is configured to support vehicle batteries. Features of the tray floor assembly 418 that are similar to the battery tray floor assembly 18 described above may not be described in detail again, and similar reference numbers are used, incremented by 400.

Figure 14A:
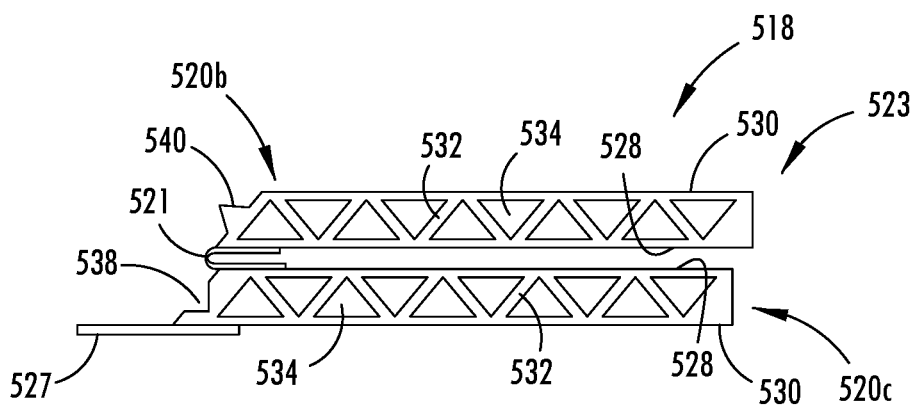
FIG. 14A is a cross-sectional view of an additional embodiment of a battery tray floor assembly, showing two tray sections in a formed state.
Figure 14B:
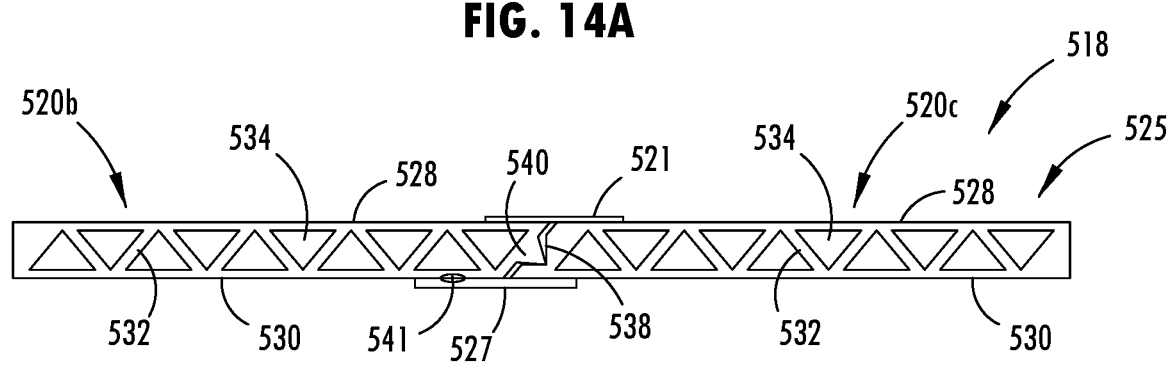
FIG. 14B is a cross-sectional view of the battery tray floor assembly of FIG. 14A, showing the two tray sections in a use state.

Moreover, as shown in FIGS. 14A and 14B, an outer tray section 520b is extruded simultaneously with an inner tray section 520c with an interconnecting piece 521 connecting between the edge portions at the upper panel portions 528 of each tray section 520b, 520d and extending longitudinally along the tray sections. With the interconnecting piece 521 intact and shown in a U-shaped configuration, as shown in FIG. 14A, the tray sections may be considered to be in an initially formed state 523. From the initially formed state 523, the interconnecting piece 521 may be deformed from the U-shape to a generally flat configuration in alignment with the upper surfaces of the upper panel portions 528 of the tray sections, such that the tray sections are in substantially planar alignment with each other. As the deformation is occurring, attachment features along the edge portions of the tray sections 520b, 520c may engage with each other, such as a protrusion 540 engaging a corresponding channel 538. Once the interconnecting piece 521 is deformed to a planar configuration as shown in FIG. 14B, a lower brace 527 that protrudes form a lower panel portion of one of the tray sections may contact the adjacent lower panel of the other panel portion. The lower brace 527 may also be used as a weld point 541, such as with a laser welder or the like. When deformed and attached together, the tray sections may be considered to be in a use state 525 forming a substantially planar structure that is configured to support vehicle batteries, such as shown and described herein. Features of the tray floor assembly 518 that are similar to the battery tray floor assembly 18 described above may not be described in detail again, and similar reference numbers are used, incremented by 500.

Figure 15A:
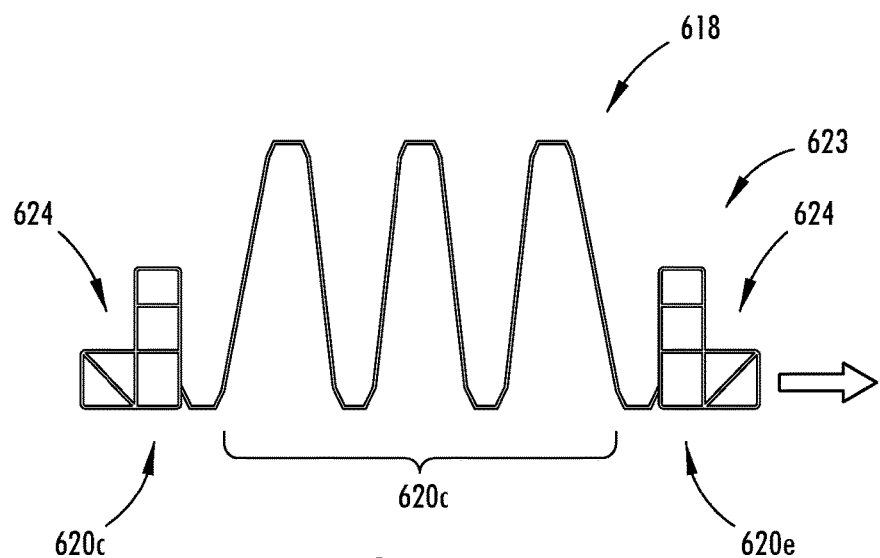
FIG. 15A is a cross-sectional view of an additional embodiment of a battery tray floor assembly, showing tray sections in a formed state.
Figure 15B:
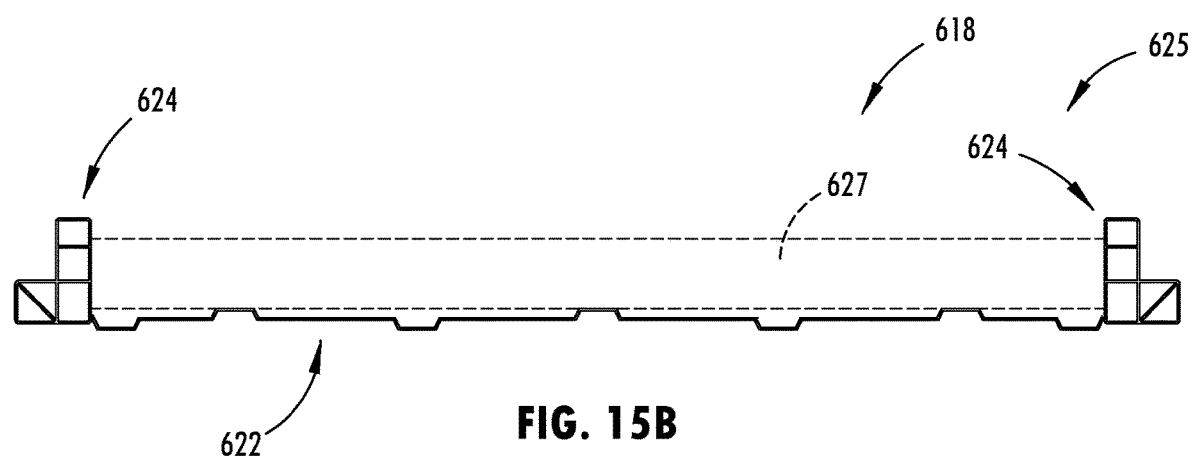
FIG. 15B is a cross-sectional view of the battery tray floor assembly of FIG. 15A, showing the tray sections in a use state.

Furthermore, additional tray sections may be integrally formed together, such as all the tray sections of a single tray assembly 618, as shown in FIGS. 15A and 15B. In the initially formed state 623, the exterior tray sections 620a, 620e are integrally formed with wall portions 624 that each includes a hollow area extending longitudinally along the exterior tray section to provide a side reinforcement member of the battery tray. Also, multiple inner tray sections 620c are integrally formed with a cross-sectional profile that has a serpentine or wave-like shape that is generally consistent longitudinally along the length of the tray sections. The tray sections, such as the illustrated inner tray sections 620c, are deformed from the initially formed state 623 to a use state by laterally displacing the exterior tray sections, such as in a stretch forming apparatus and/or press to form a substantially planar floor structure 622 as shown in FIG. 15B. To further support and reinforce the floor portion 622 of the tray floor assembly 619, one or more cross members 627 may be disposed laterally between the wall portions 624 of the side reinforcement members. It is also shown that the floor structure 622 of the tray floor assembly 618 may include longitudinal stiffeners that include upward and downward facing channels integrally formed into the cross-sectional profile so as to extending longitudinally along the floor portion of the tray. Features of the tray floor assembly 618 that are similar to the battery tray floor assembly 18 described above may not be described in detail again, and similar reference numbers are used, incremented by 600.

Figure 16:
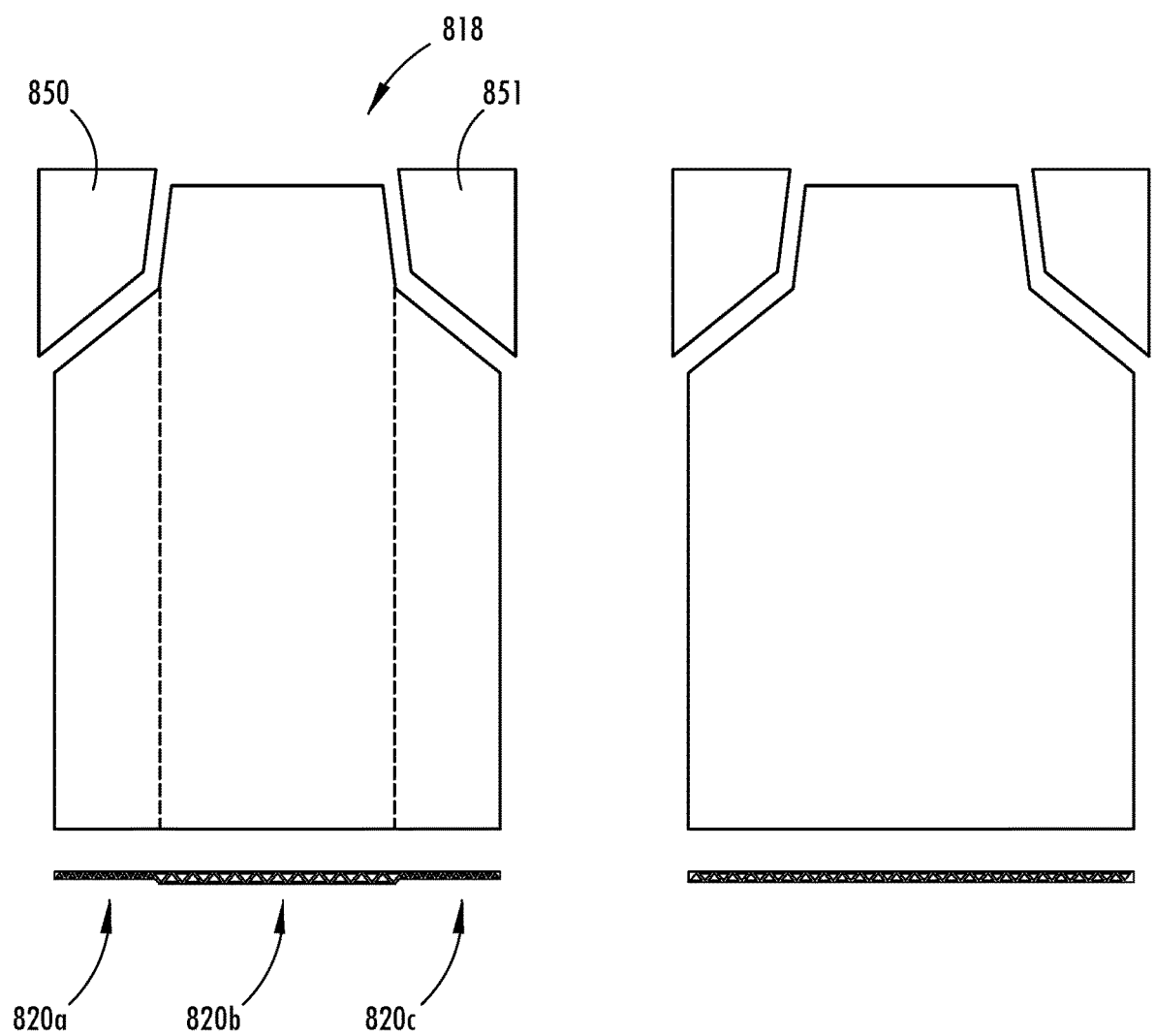
FIG. 16 shows top plan views and corresponding cross-sectional views of a battery tray floor assembly alongside a monolithic floor structure, showing trimmed sections removed.
Figure 17:
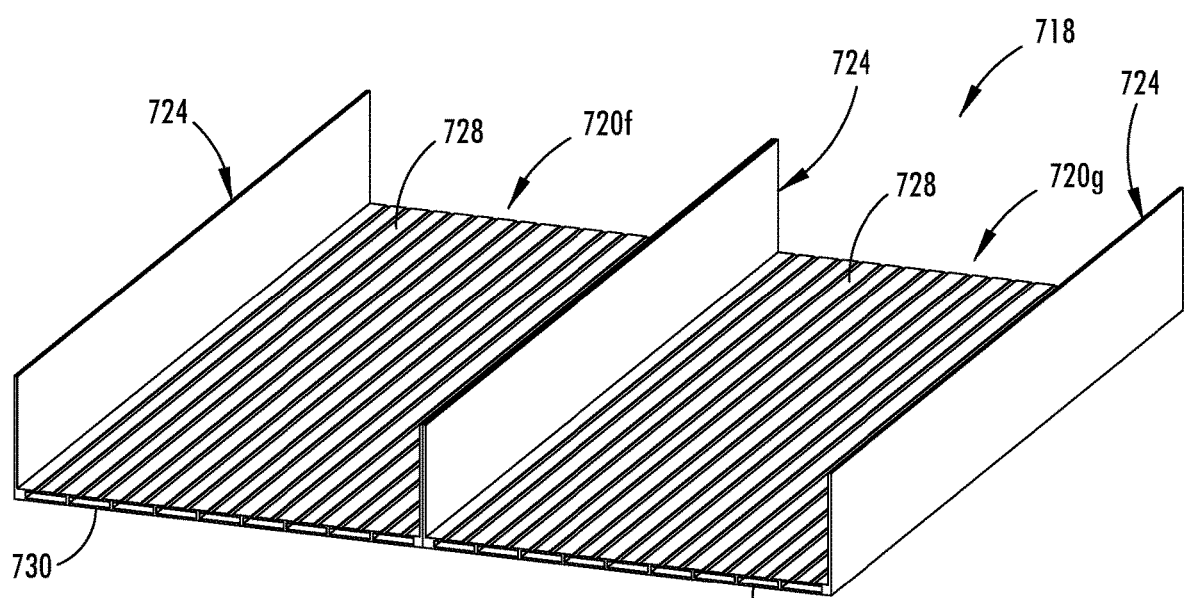
FIG. 17 is an upper perspective view of an additional battery tray floor assembly.
Figure 18:
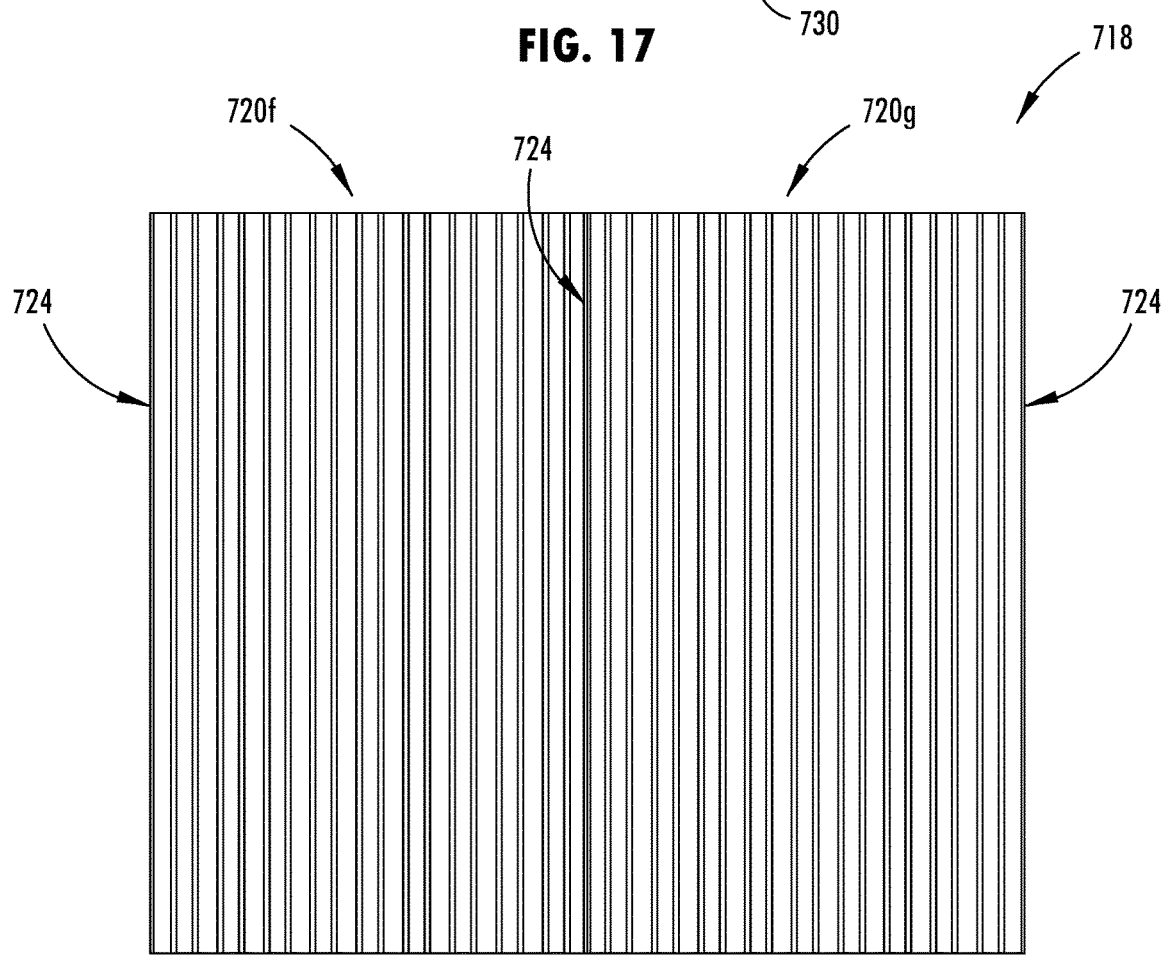
FIG. 18 is a top plan view of the tray floor assembly shown in FIG. 17.
Figure 19:
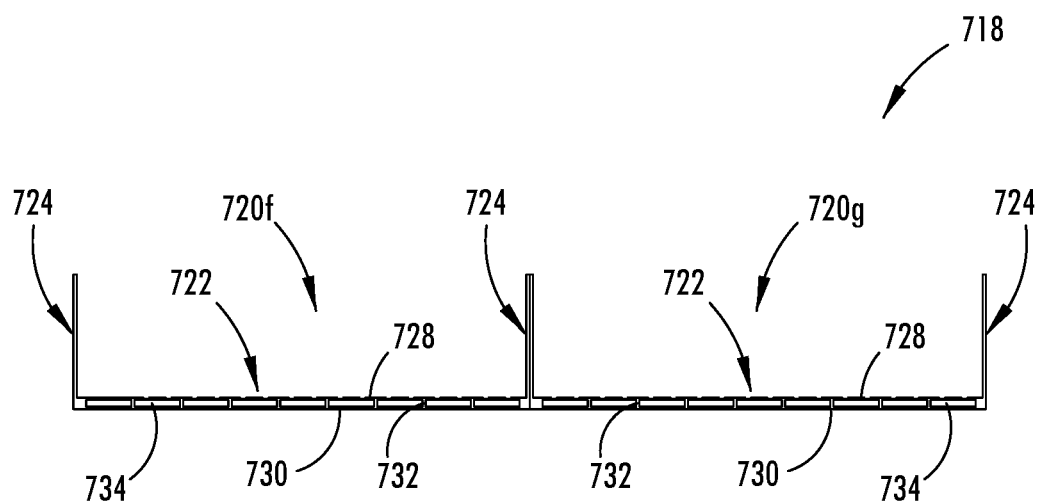
FIG. 19 is an end elevational view of the tray floor assembly shown in FIG. 17.
Figure 20:
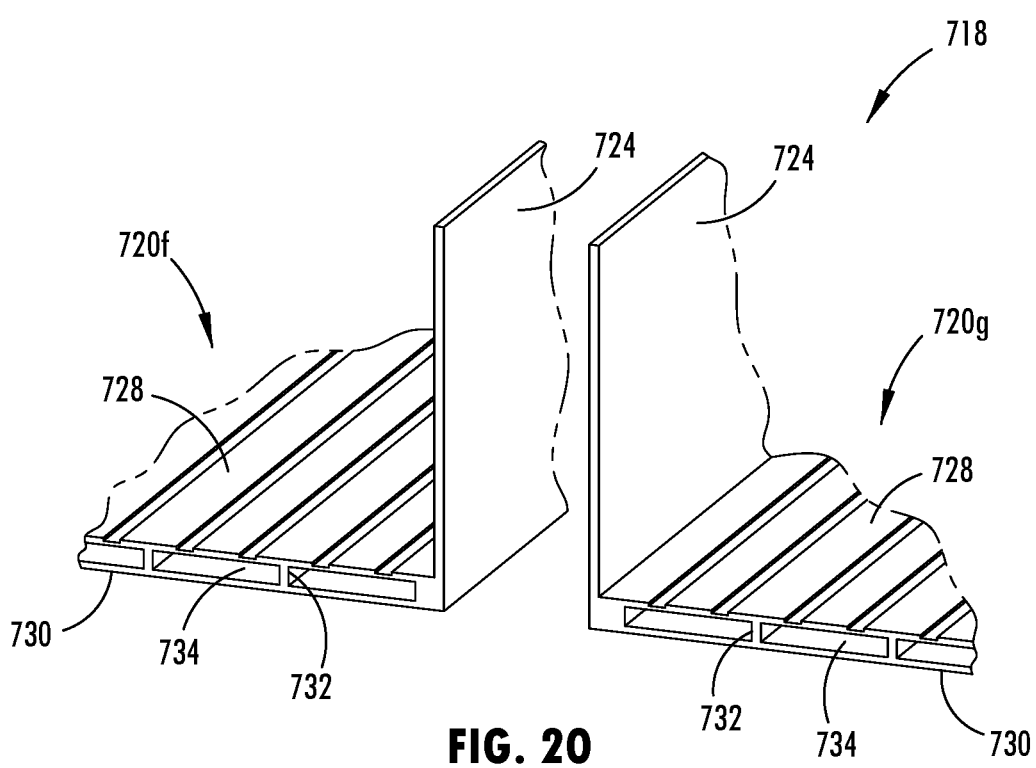
FIG. 20 is an enlarged perspective view of the tray floor assembly shown in FIG. 17, showing the tray sections exploded away from each other.

Once the tray floor assembly is formed, it may be trimmed to accommodate the perimeter shape of the battery tray, such as shown in FIG. 16. A similar tray perimeter is shown in FIG. 2 in an example of the completed tray 10. In FIG. 16, the tray floor assembly is shown at the left with a thickness of 2 millimeters at the exterior tray sections and a thickness of 5 millimeters at a central tray section 820b. Thus, when pieces 850, 851 are trimmed from the tray floor assembly 818, they are taken from the exterior tray sections 820a, 820c, such that the mass of material removed is less than if the tray floor were monolithic, having a single thickness greater than 2 millimeters over the entire panel, such as shown to the right in FIG. 16 as a thickness of 4 millimeters. It is also contemplated that the exterior tray sections may have a shorter longitudinal length than the corresponding central tray section, so that the pieces that need to be trimmed are reduced in size.

Optionally, the battery tray floor assembly may be formed to arrange the tray sections in a manner that they extend laterally relative to vehicle, such that the tray section have a substantially constant cross-sectional profile laterally across the battery tray, such as the floor assembly 718 shown in FIGS. 17-20. In this embodiment, the tray sections may be engineered to have desired load capacity and performance for locating the batteries at the desired longitudinal position on the battery tray. Accordingly, the tray floor assembly 718 provides at least two separate tray sections 720*e*, 720*f* that are formed to each have a cross-sectional profile that is substantially consistent laterally across the width of the battery tray. This generally consistent profile each tray section may be formed by extrusion, such as with an aluminum alloy, or pultrusion, such as with a resin and composite substrate. Similar to the embodiments described above, the adjacent tray sections may be attached together, such as with engagement features that include one or more of mechanically engaged geometric features, such as protrusions and channels, welding, adhesive, fasteners and the like. The tray sections shown in FIGS. 17-20 also include intermediate wall portions 724 that protrude upward from the edges of the respect floor portions 722. Further, the upper surface of the illustrated floor portions 722 may include upward facing channels. Features of the tray floor assembly 718 that are similar to the battery tray floor assembly 18 described above may not be described in detail again, and similar reference numbers are used, incremented by 700.

Several different attachment techniques and configurations may be used to permanently or releasable secure the battery tray to a vehicle frame, such as below a floor of the vehicle and generally between the axles. Further, with respect to the general installation or attachment or formation, the steps discussed herein may be performed in various different sequences from those discussed to result in engaging, disengaging, or forming the battery tray or components thereof.

It is to be understood that the specific devices and processes illustrated in the attached drawings, and described in this specification are simply exemplary embodiments of the inventive concepts defined in the appended claims. Hence, specific values and other precise physical characteristics relating to the embodiments disclosed herein are not to be considered as limiting, unless the claims expressly state otherwise.

Changes and modifications in the specifically described embodiments may be carried out without departing from the principles of the present disclosure, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle battery tray comprising:
    a floor assembly having a plurality of elongated tray sections that attach together at lateral edge portions of adjacent tray sections of the plurality of elongated tray sections to form a floor structure that is configured to support vehicle batteries contained in the vehicle battery tray;
    wherein the plurality of elongated tray sections each comprise a substantially consistent cross-sectional shape extending longitudinally along a length of the elongated tray section;
    wherein a thickness of one of the plurality of elongated tray sections at a central area of the floor structure is greater than a thickness of another one of the plurality of elongated tray sections at an outboard area of the floor structure; and
    wherein the central area of the floor structure is configured to withstand an equal or greater transverse bending moment than the outboard area of the floor structure.

2. The vehicle battery tray of claim 1, wherein at least one of the plurality of elongated tray sections comprises an aluminum alloy.

3. The vehicle battery tray of claim 1, wherein each of the plurality of elongated tray sections comprises an upper panel portion that at least partially forms an upper surface of the floor structure formed by the plurality of tray sections.

4. The vehicle battery tray of claim 3, wherein each of the plurality of elongated tray sections comprises a lower panel portion that is separated from the upper panel portion to provide a hollow area extending longitudinally along the length of the respective tray section.

5. The vehicle battery tray of claim 4, wherein each of the plurality of elongated tray sections comprises intermediate members that integrally interconnect between the upper and lower panel portions to divide the hollow area into multiple elongated hollow channels disposed between the upper and lower panel portions.

6. The vehicle battery tray of claim 1, wherein an outer tray section of the plurality of elongated tray sections comprises a panel portion that partially forms the floor structure, and wherein the outer tray section comprises a wall portion integrally protruding upward from the panel portion of the outer tray section to at least partially form a peripheral wall structure of the vehicle battery tray.

7. The vehicle battery tray of claim 6, wherein the wall portion of the outer tray section comprises an hollow area extending longitudinally along the length of the outer tray section.

8. The vehicle battery tray of claim 1, wherein at least one of the lateral edge portions of the plurality of elongated tray sections includes a substantially horizontal surface that attaches at a corresponding substantially horizontal surface of the adjacent tray section.

9. The vehicle battery tray of claim 1, wherein, when in an initially formed state, at least two adjacent tray sections of the plurality of tray sections are integrally interconnected, and wherein the at least two adjacent tray sections are displaced from the initially formed state to an assembly state that horizontally aligns the at least two adjacent tray sections to at least partially form the floor structure.

10. The vehicle battery tray of claim 1, wherein the plurality of elongated tray sections comprises an inner tray section disposed at the central area of the floor structure and outer tray sections disposed at the outboard areas of the floor structure.

11. The vehicle battery tray of claim 10, wherein the outer tray sections each comprise a wall portion, and wherein the vehicle battery tray comprises front and rear tray enclosure members that extend laterally across the plurality of elongated tray section and attach at the wall portions of the outer tray sections to together form a peripheral wall structure that surrounds a battery containment area of the vehicle battery tray.

12. A tray floor assembly for a vehicle battery tray, said tray floor assembly comprising:
   a plurality of elongated tray sections that attach together to form a substantially planar floor structure that is configured to support vehicle batteries;
   wherein the plurality of elongated tray sections each extend longitudinally and parallel relative to each other and each comprise a transverse cross-sectional profile that is substantially consistent longitudinally along its length;
   wherein the cross-sectional profile of at least one of the plurality of elongated tray sections includes a thickness between an upper surface and a lower surface of the floor structure that increases laterally across a width of the cross-sectional profile;
   wherein, when in an initially formed state, adjacent tray sections of the plurality of elongated tray sections are integrally interconnected; and
   wherein the adjacent tray sections are displaced from the initially formed state to an assembly state that positions the adjacent tray sections with the upper surfaces in substantially planar alignment with each other.

13. The tray floor assembly of claim 12, wherein the thickness at a central area of the floor structure is greater than the thickness at opposing outboard areas of the floor structure.

14. The tray floor assembly of claim 12, wherein at least one of the plurality of elongated tray sections comprises an aluminum extrusion.

15. The tray floor assembly of claim 12, wherein at least one of the plurality of elongated tray sections comprises (i) an upper panel portion that at least partially forms the upper surface of the floor structure, (ii) a lower panel portion that is separated from the upper panel portion to provide a hollow area extending longitudinally along the length of the respective tray section, and (iii) intermediate stiffening members that integrally interconnect between the upper and lower panel portions to laterally divide the hollow area.

16. The tray floor assembly of claim 12, wherein the plurality of elongated tray sections comprises outer tray sections on opposing lateral sides of the floor structure that each have a wall portion that partially forms a peripheral wall structure of the vehicle battery tray.

17. A tray floor assembly for a vehicle battery tray, said tray floor assembly comprising:
   a plurality of elongated tray sections that attach together to form a substantially planar floor structure that is configured to support vehicle batteries;
   wherein the plurality of elongated tray sections each extend longitudinally and parallel relative to each other and each comprise a transverse cross-sectional profile that is substantially consistent longitudinally along its length;
   wherein the cross-sectional profile of at least one of the plurality of elongated tray sections includes a thickness between an upper surface and a lower surface of the floor structure that increases laterally across a width of the cross-sectional profile; and
   wherein the plurality of elongated tray sections each include an attachment feature that attaches at a corresponding attachment feature of an adjacent tray section of the plurality of elongated tray sections.

18. The tray floor assembly of claim 17, wherein each of the plurality of elongated tray sections comprises a hollow area disposed in the thickness between the upper and lower surfaces and extending longitudinally along the length of the respective elongated tray section.

19. The tray floor assembly of claim 17, wherein the plurality of elongated tray sections comprises outer tray sections on opposing lateral sides of the substantially planar floor structure and an inner tray section disposed between the outer tray sections, wherein the thickness of the inner tray section is greater than a thickness of the outer tray sections.

20. The tray floor assembly of claim 17, wherein a central area of the floor structure is configured to withstand an equal or greater transverse bending moment than an outboard area of the floor structure.

* * * * *